US008792155B2

United States Patent
Li et al.

(10) Patent No.: US 8,792,155 B2
(45) Date of Patent: Jul. 29, 2014

(54) ATHERMAL DQPSK AND/OR DPSK DEMODULATOR

(71) Applicant: Finisar Corporation, Sunnyvale, CA (US)

(72) Inventors: Huiping Li, Shanghai (CN); Fan Chen, Shanghai (CN); Xiaolin Chen, Shangai (CN); Fahua Lan, Shanghai (CN)

(73) Assignee: Finisar Corporation, Sunnyvale, CA (US)

( * ) Notice: Subject to any disclaimer, the term of this patent is extended or adjusted under 35 U.S.C. 154(b) by 6 days.

(21) Appl. No.: 13/622,656

(22) Filed: Sep. 19, 2012

(65) Prior Publication Data
US 2013/0271822 A1    Oct. 17, 2013

(30) Foreign Application Priority Data
Apr. 13, 2012  (CN) .......................... 2012 1 0115288

(51) Int. Cl.
*G02F 2/00*    (2006.01)
(52) U.S. Cl.
USPC .......................................................... 359/325
(58) Field of Classification Search
USPC ............................................ 385/11; 359/325
See application file for complete search history.

(56) References Cited

U.S. PATENT DOCUMENTS

| | | | | |
|---|---|---|---|---|
| 6,005,697 | A * | 12/1999 | Wu et al. ........................ | 398/48 |
| 6,134,031 | A * | 10/2000 | Nishi et al. ..................... | 359/15 |
| 6,335,830 | B1 * | 1/2002 | Chang et al. ............. | 359/484.07 |
| 6,455,841 | B2 * | 9/2002 | Zhou et al. .................... | 250/225 |
| 6,609,841 | B1 * | 8/2003 | Wilde et al. ................... | 398/159 |
| 6,900,938 | B2 * | 5/2005 | Zhao ........................ | 359/489.07 |
| 7,627,251 | B2 * | 12/2009 | Walther et al. ................ | 398/118 |
| 2012/0008951 | A1 * | 1/2012 | Mikami .......................... | 398/65 |

* cited by examiner

*Primary Examiner* — Daniel Petkovsek
(74) *Attorney, Agent, or Firm* — Machoff Brennan

(57) ABSTRACT

In some example embodiments, a demodulator may include an input polarization beam splitter (IPBS), input half waveplate (IHWP), cubical polarization beam splitter (CPBS), first reflector (R1), second reflector (R2), first quarter waveplate (QWP1), second quarter waveplate (QWP2), beam displacer (BD), output half waveplate (OHWP), and output polarization beam splitter (OPBS). The CPBS may be positioned to receive an output from IPBS. The IHWP may be positioned between IPBS and CPBS. The R1 may be positioned to receive and return a first output from CPBS. The QWP1 may be positioned between CPBS and R1. The R2 may be positioned to receive and return a second output from CPBS. The QWP2 may be positioned between CPBS and R2. The BD may be positioned to receive a third output from CPBS. The OPBS may be positioned to receive an output from BD. The OHWP may be positioned between BD and OPBS.

19 Claims, 18 Drawing Sheets

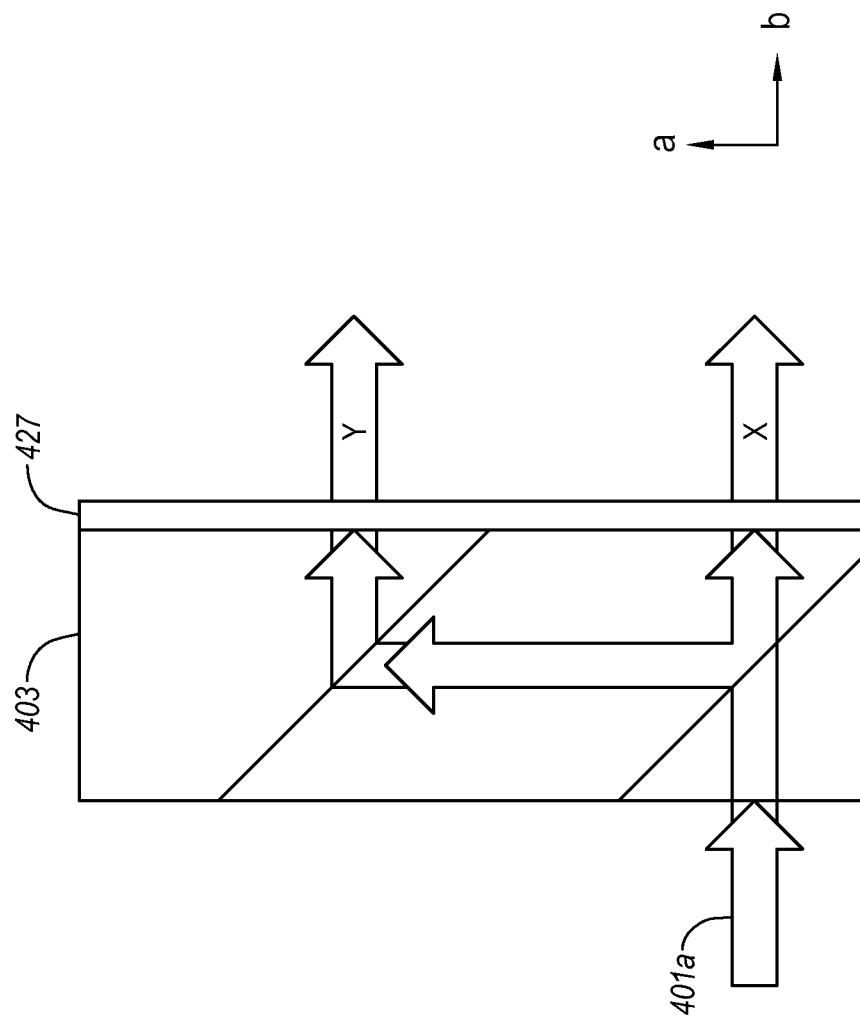

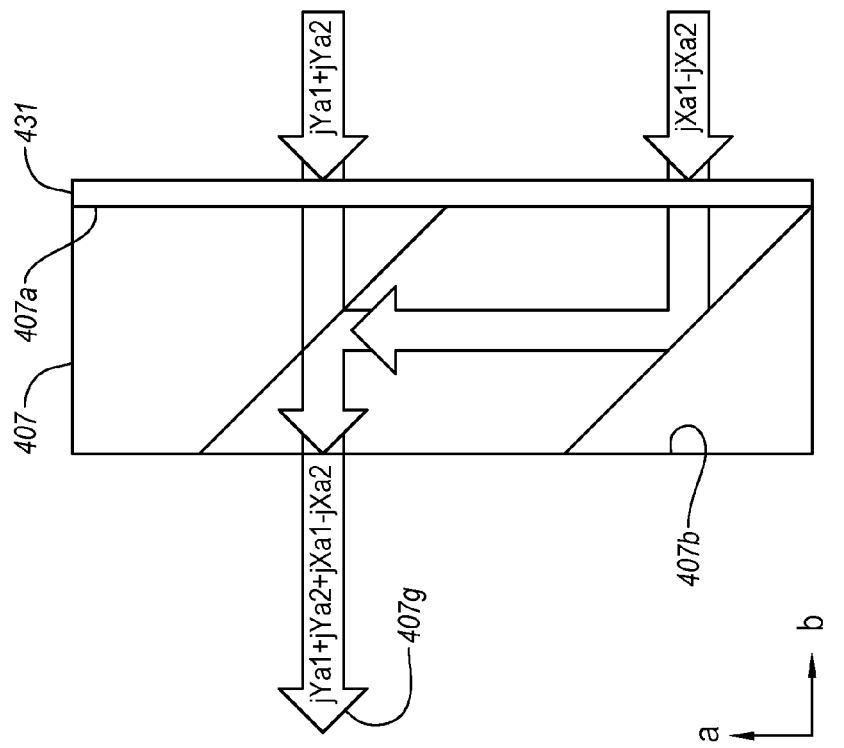
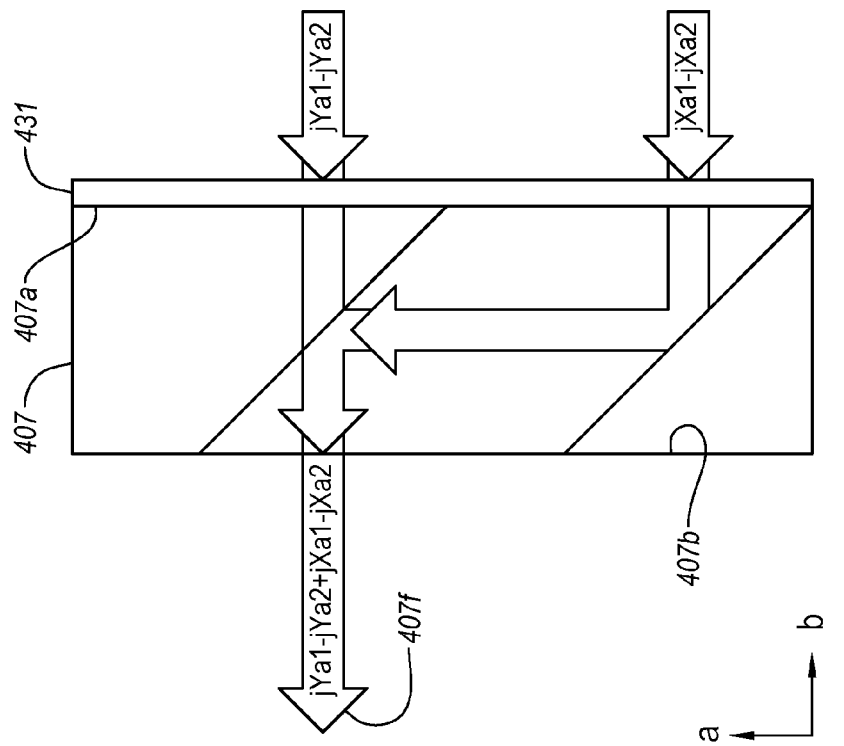

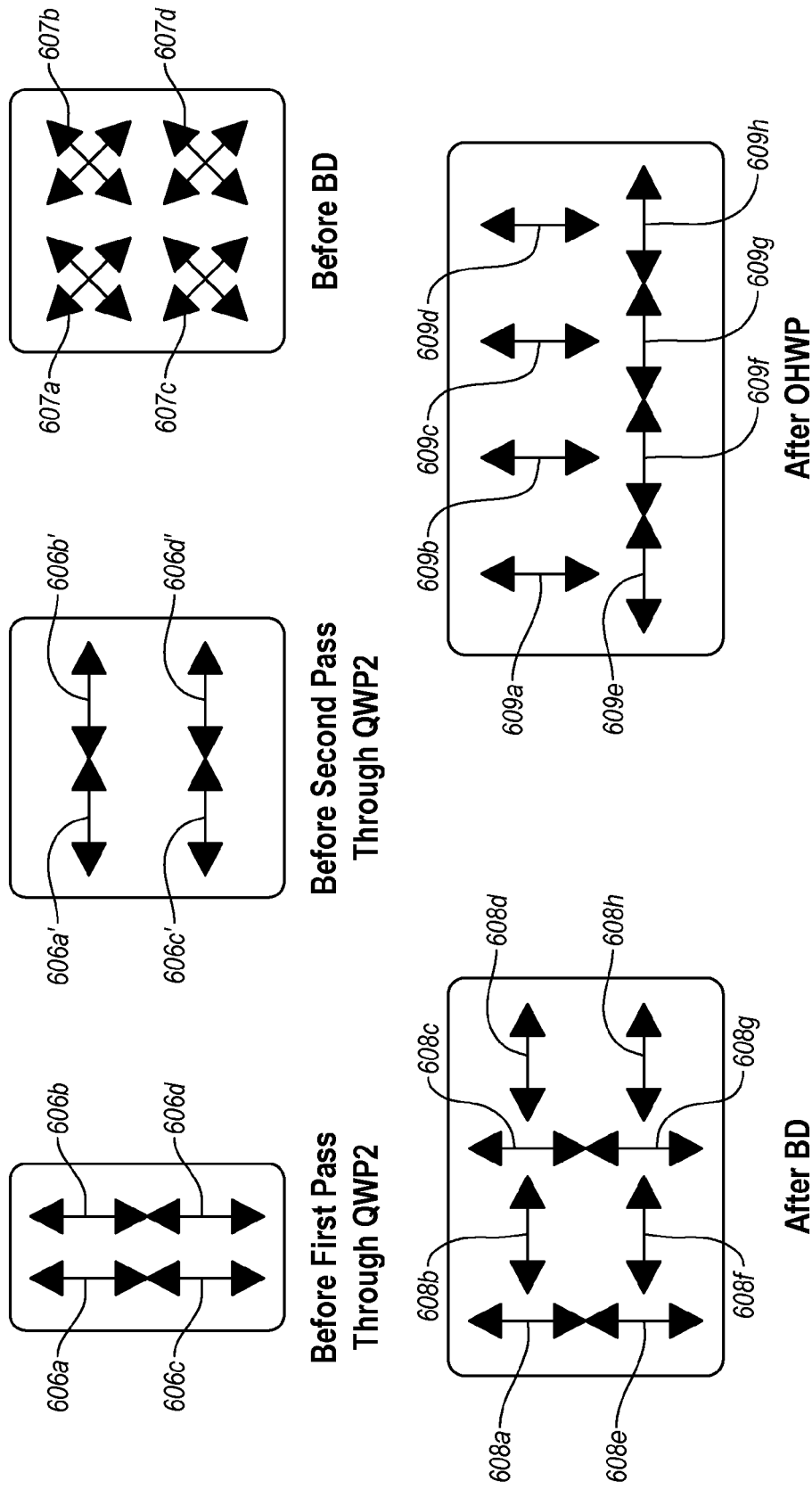

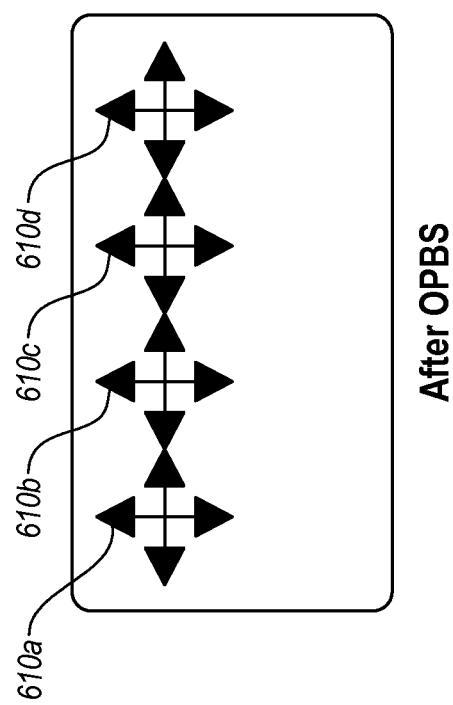

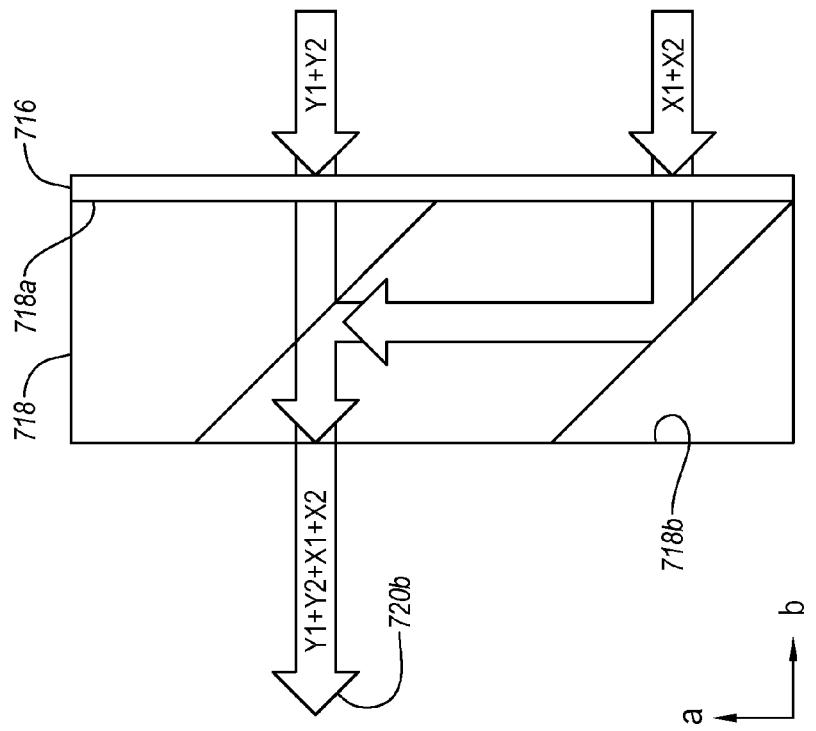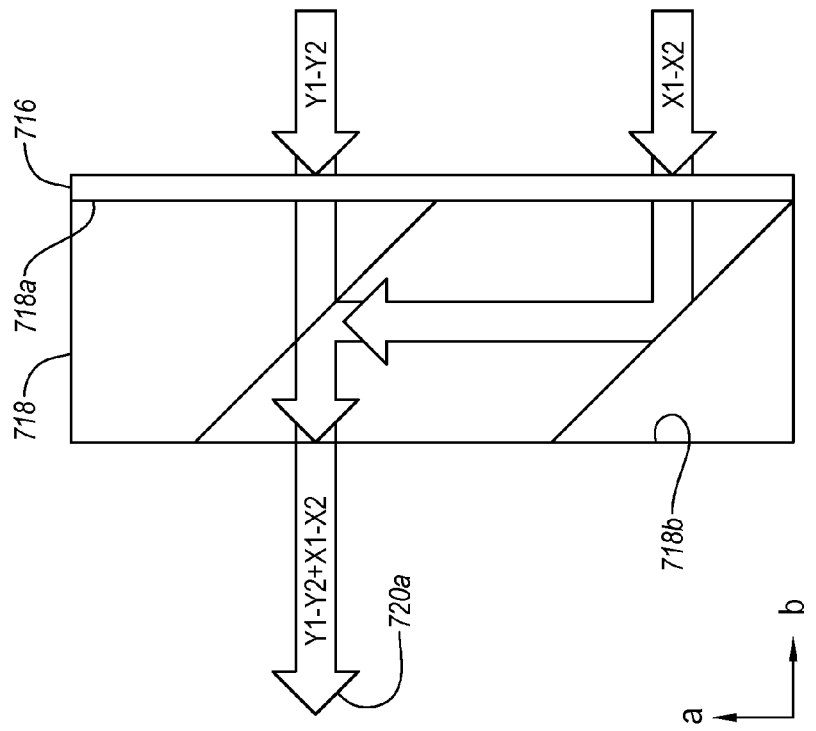

ATHERMAL DQPSK AND/OR DPSK DEMODULATOR

CROSS-REFERENCE TO RELATED APPLICATIONS

This application claims priority to Chinese Patent Application No. 201210115288.8, filed Apr. 13, 2012, titled ATHERMAL DQPSK AND/OR DPSK DEMODULATOR, which is incorporated herein by reference in its entirety.

BACKGROUND

1. Field of the Invention

The present invention generally relates to optical communication systems. More particularly, some example embodiments relate to demodulators for phase shift keyed signals.

2. Related Technology

Communication technology has transformed our world. As the amount of information communicated over networks has increased, high speed transmission has become ever more critical. High speed communications often rely on the presence of high bandwidth capacity links between network nodes. For optical links, an optoelectronic module such as a transceiver or transponder module at one network node converts electrical data into optical data for transmission on the optical channel. At the other network node, another transceiver module receives the optical signal, and converts the signal into an electrical signal. Transceivers are equipped with transmit and receive channels, such that bi-directional communication is possible.

Presently, standards are being developed for optical links at a speed of 40 Gigabits per second (sometimes abbreviated as "40G"). In fact, the Institute for Electrical and Electronics Engineers, Inc. (often referred to as "IEEE" for short), a leading professional association in the art of networking technologies, has recently voted that the next generation of Ethernet technology will provide support for 40 Gigabit Ethernet as well as 100 Gigabit Ethernet, and has established several task forces to develop appropriate standards that are yet under development.

Currently, 40G Single Mode Fiber ("SMF") and Multi-Mode Fiber ("MMF") standards for Ethernet optical link applications are under development. The signals sent in a 40G fiber will be required to be modulated using phase shift keying (PSK), differential phase shift keying (DPSK), or differential quadrature phase shift keying (DQPSK) on the transmit side, and demodulated at the receive side.

A PSK optical signal typically includes a return-to-zero (RZ) signal having a series of relatively high intensity pulses separated by low intensity regions. For a DPSK optical signal, the phase difference between adjacent pulses may encode information. For example, in some DPSK encoding schemes, a phase difference of π encodes a one bit whereas a phase difference of zero or 2π encodes a zero bit. For a DQPSK optical signal, the phase differences may be, for instance, 0 (or 2π), π/2, π, and 3π/2 corresponding to data bits "00", "01", "11", and "00" respectively.

Demodulation of a PSK signal includes converting the phase information encoded in the pulses into amplitude modulation such that the data can be detected by means of a photodiode or other optical sensor. In a conventional demodulator, this is accomplished by means of a delay line interferometer ("DLI"), such as a Mach-Zehnder interferometer or Michelson interferometer. A DLI operates by dividing an input signal into first and second signals. The first and second signals travel along paths of different lengths and are then rejoined into one or more output signals. The difference in path length is chosen such that upon recombining, the first and second signals will constructively and/or destructively interfere with one another depending on the phase difference between adjacent pulses.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some example embodiments described herein generally relate to demodulators, such as DPSK and DQPSK demodulators.

In some example embodiments, a demodulator may include an input polarization beam splitter; an input half waveplate, a cubical polarization beam splitter, a first reflector, a second reflector, a first quarter waveplate, a second quarter waveplate, a beam displacer, an output half waveplate, and an output polarization beam splitter. The cubical polarization beam splitter may be positioned to receive an output from the input polarization beam splitter. The input half waveplate may be positioned between the input polarization beam splitter and the cubical polarization beam splitter. The first reflector may be positioned to receive and return a first output from the cubical polarization beam splitter. The first quarter waveplate may be positioned between the cubical polarization beam splitter and the first reflector. The second reflector may be positioned to receive and return a second output from the cubical polarization beam splitter. The second quarter waveplate may be positioned between the cubical polarization beam splitter and the second reflector. The beam displacer may be positioned to receive a third output from the cubical polarization beam splitter. The output polarization beam splitter may be positioned to receive an output from the beam displacer. The output half waveplate may be positioned between the beam displacer and the output polarization beam splitter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5C illustrates a side view of an input polarization beam splitter and input half waveplate of the DQPSK demodulator of FIGS. 5A and 5B, and the propagation of signals through the input polarization beam splitter and the input half waveplate;

FIGS. 5H-5K illustrate a first, second, third, and fourth side view of an output polarization beam splitter and an output half waveplate of the DPSK demodulator of FIGS. 5A and 5B, and depicts propagation of signals through the output polarization beam splitter and the output half waveplate;

FIGS. 6A-6C illustrate various polarization states of signals propagating through the components illustrated in FIGS. 5A-5K;

FIG. 7D illustrates a first side view of an output polarization beam splitter and an output half waveplate of the DPSK demodulator of FIGS. 7A and 7B, and the propagation of signals through the output polarization beam splitter and the output half waveplate;

FIG. 7E illustrates a second side view of the output polarization beam splitter and the output half waveplate of the DPSK demodulator of FIGS. 7A and 7B, and the propagation of signals through the output polarization beam splitter and the output half waveplate;

DETAILED DESCRIPTION OF SOME EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

I. Example Operating Environment

Figure 1:
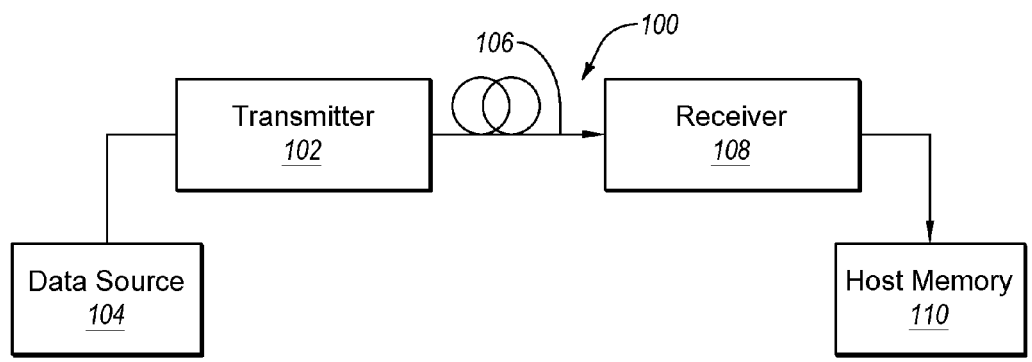
FIG. 1 illustrates a fiber optic communication system suitable for use in accordance with some embodiments.

Referring to FIG. 1, an operating environment of a fiber optic communication system 100 suitable for use in accordance with some embodiments includes a differential, or differential quadrature, phase-shift keyed (DPSK or DQPSK) transmitter 102 that encodes data from a data source 104 into a DPSK or DQPSK optical signal (not shown) carried on an optical fiber 106. Depending on the configuration of the transmitter 102, the optical signal may include a DPSK optical signal, or a DQPSK optical signal. In DPSK and DQPSK optical signals, a phase difference of the DPSK or DQPSK optical signal represents a particular symbol or pattern of bits. The phase difference in a DPSK optical signal may be one of two possible values, each corresponding to a different 1-bit symbol (e.g., 1 or 0), while the phase difference in a DQPSK optical signal may be one of four possible values, each corresponding to a different 2-bit symbol (e.g., 00, 01, 10, or 11).

The optical signal generated by the transmitter 102 is transmitted over the optical fiber 106 to a receiver 108 including a DPSK or DQPSK demodulator. The demodulator converts the DPSK or DQPSK signal into multiple demodulated signals, which are then transmitted to another device for storage and/or processing, such as a host memory 110 of a host device (not shown). The receiver 108 may include, in addition to the demodulator, one or more other components, which serve to communicate the multiple demodulated signals from the demodulator to the host memory 110. The one or more other components may include, but are not limited to, a collimated ribbon array 307 (FIG. 3) which then provides the signals to one or more opto-electronic receivers (not shown) connected to the host memory 110.

Figure 2A:
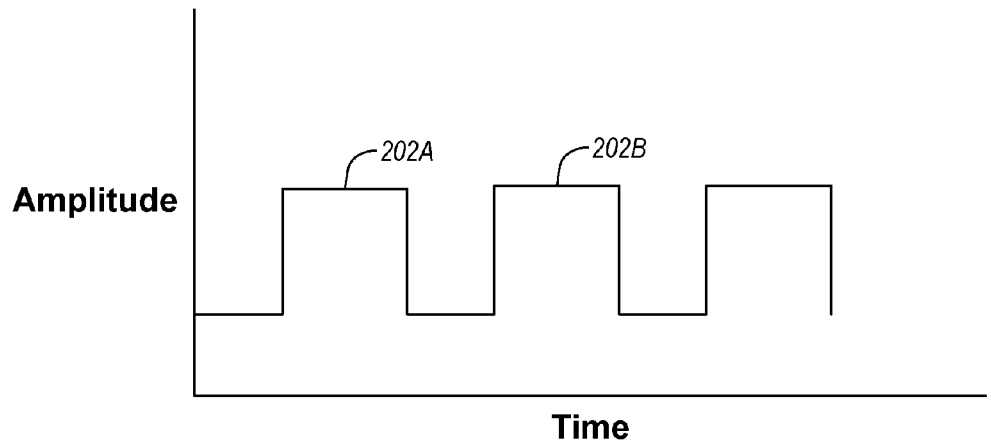
FIGS. 2A and 2B illustrate attributes of a DPSK or DQPSK signal suitable for demodulation in accordance with some embodiments.
Figure 2B:
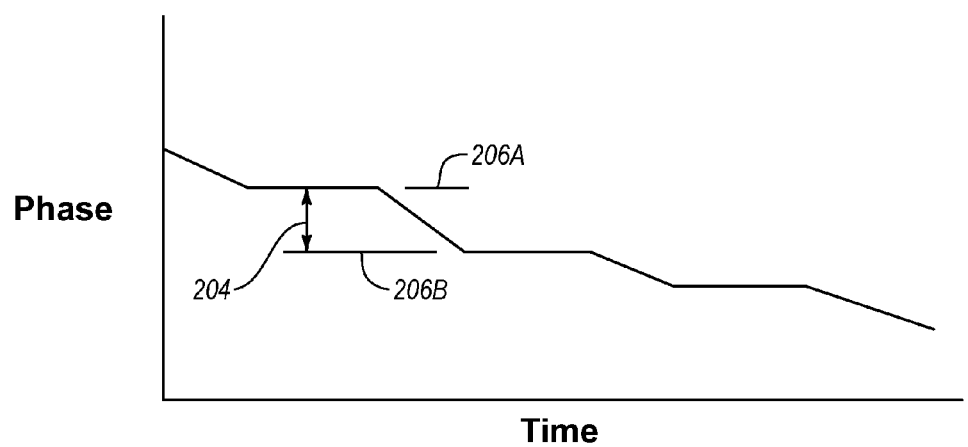

Referring to FIG. 2A, a DPSK optical signal or a DQPSK optical signal, may have the illustrated return-to-zero (RZ) amplitude profile including pulses 202A, 202B separated by local minima. Each pulse 202B has a phase difference 204 relative to a preceding pulse 202A as shown by the phase profile of FIG. 2B. The phase difference 204 between the phases 206A, 206B of the pulses 202A, 202B, respectively, encodes information. In an example DPSK modulation scheme, a phase difference 204 of $\pi$ encodes a one bit whereas a phase difference 204 of 0 or a multiple of $2\pi$ encodes a zero bit. In an example DQPSK modulation scheme, phase differences 204 of 0, $\pi/2$, $\pi$, and $3\pi/2$ are each assigned a unique two-bit value. For instance, phase differences 204 of 0, $\pi/2$, $\pi$, and $3\pi/2$ are assigned unique two-bit values of 00, 01, 11 and 10, respectively, according to some embodiments.

II. Example DQPSK Demodulator System

Figure 3:
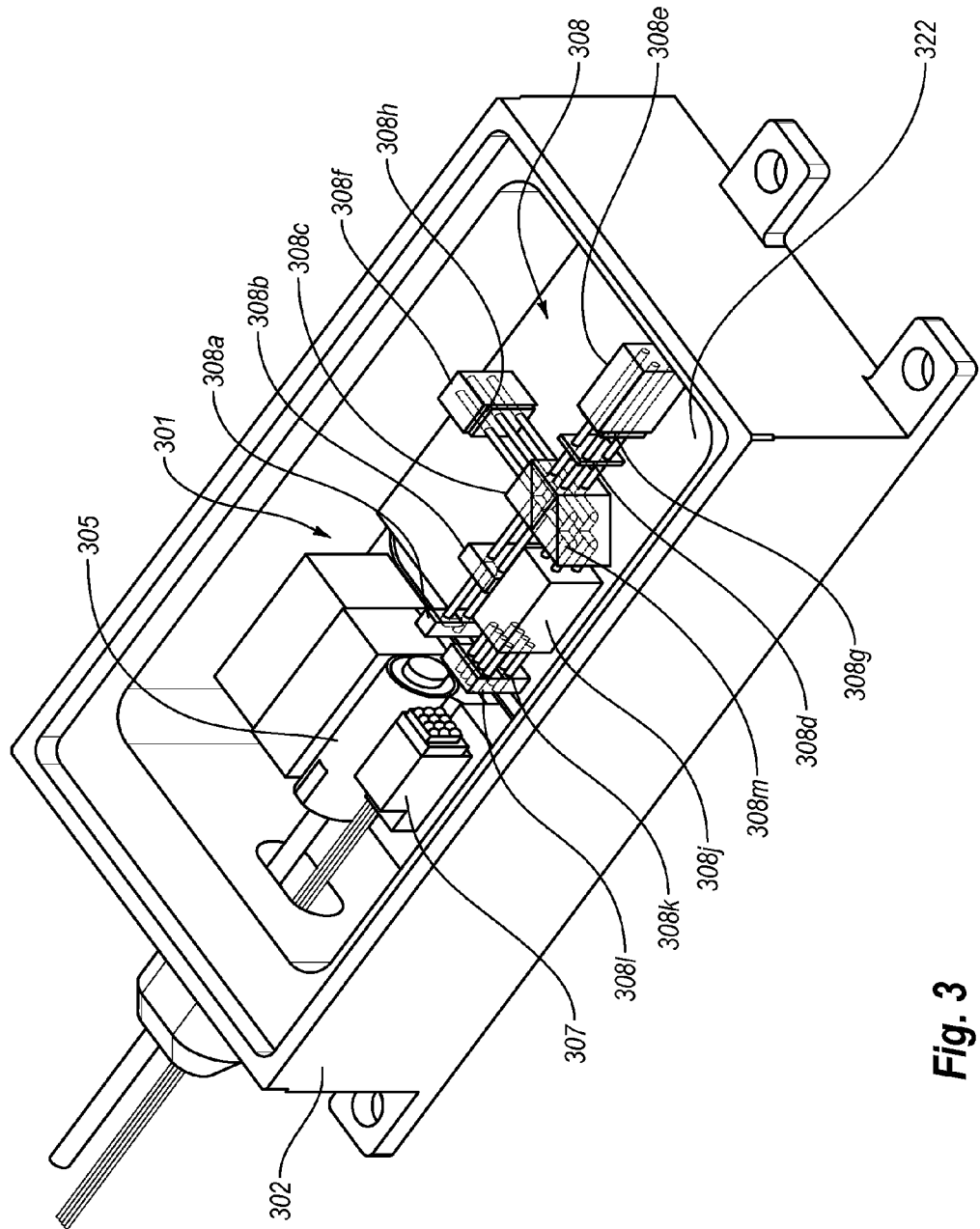
FIG. 3 illustrates a perspective view of an example embodiment of a DQPSK demodulator and additional components that may be implemented in the fiber optic communication system of FIG. 1 according to some embodiments.

Referring to FIG. 3, an example embodiment of a DQPSK demodulator 301 and additional components suitable for use in the fiber optic communication system 100 of FIG. 1 is disclosed. For instance, the DQPSK demodulator 301 and additional components may correspond to the receiver 108 of FIG. 1. FIG. 3 illustrates a perspective view of the DQPSK demodulator 301 enclosed in a housing 302. The DQPSK demodulator 301 is positioned to receive an input modulated signal from a collimator 305, and a collimated ribbon array 307 is positioned to receive the outputs of the DQPSK demodulator 301, and provide the outputs to a receiving device (not shown) of an external host (not shown).

The DQPSK demodulator 301 may include various optical components, generally designated at 308. The optical components 308 in the embodiment of FIG. 3 may include, for instance, input and intermediate polarization beam splitters 308a, 308b, a cubical polarization beam splitter 308c, a silicon plate 308d, first and second reflectors 308f, 308e, first and second quarter waveplates 308h, 308g, a redirecting element 308m, a beam displacer 308j, a half waveplate 308k, and an output polarization beam splitter 308l.

Figure 4:
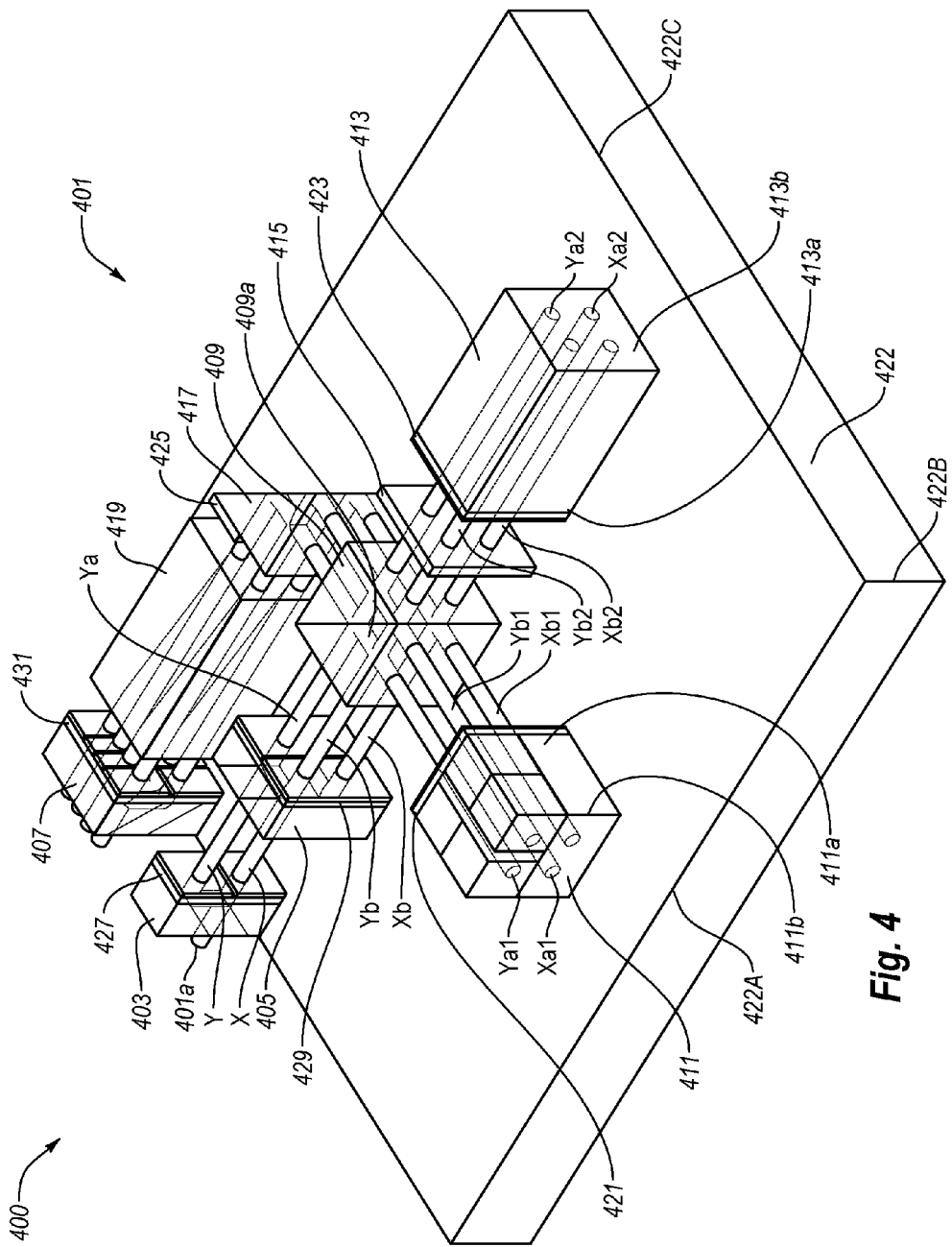
FIG. 4 illustrates a perspective view of an embodiment of a DQPSK demodulator that may be implemented in the fiber optic communication system of FIG. 1.

Referring to FIG. 4, a perspective view of various optical components 400 is disclosed that may be implemented in a DQPSK demodulator 401, arranged in accordance with at least some embodiments disclosed herein. The optical components 400 are disposed in an optical layout that is generally a mirror image of the optical components 308 of FIG. 3. As such, the optical components 400 may be implemented, in some embodiments, in a DQPSK demodulator that may have a mirror image layout as that shown for the DQPSK demodulator 301 of FIG. 3, for instance.

In general, the optical components 400 shown in FIG. 4 can be arranged to receive an input modulated signal from a collimator and can be positioned to deliver an output demodulated signal to a collimated ribbon array in a manner similar to that explained above with respect to FIG. 3. The DQPSK demodulator 401 may include an input polarization beam splitter (IPBS) 403, an intermediate polarization beam splitter (intermediate PBS) 405, and an output polarization beam splitter (OPBS) 407. A beam displacer (BD) 419 is also provided. The DQPSK demodulator 401 also includes a cubical polarization beam splitter (CPBS) 409, a first reflector (R1) 411, a second reflector (R2) 413, a silicon plate 415, and a redirecting element such as a right angle reflector (RAR) 417. The DQPSK demodulator 401 also includes a first quarter waveplate (QWP1) 421, a second quarter waveplate (QWP2) 423, a third quarter waveplate (QWP3) 425, an input half waveplate (IHWP) 427, an intermediate half waveplate (intermediate HWP) 429, and an output half waveplate (OHWP) 431.

R1 411 and R2 413 may be composed of the same and/or different materials as discussed in more detail below. Although, in some embodiments, R1 411 and R2 413 may be composed of different material, they may be thermally matched such that R1 411 and R2 413 have the same optical path change caused by the coefficient of thermal expansion and thermo-optics coefficient. The thermal matching of R1 411 and R2 412 may provide the DQPSK demodulator 401 with an athermal design such that changes in environmental temperature and in the components of the DQPSK demodulator 401 do not affect the functionality of the demodulator.

Optionally, the foregoing components of the DQPSK demodulator 401 may be formed on, or otherwise coupled to, a substrate 422. The substrate 422 may include fused silica or other suitable substrate material. In some embodiments, the substrate may have a length, e.g., as measured along edge 422A, of about 21 millimeters ("mm"), a height, e.g., as measured along edge 422B, of about 2 mm, and a width, e.g., as measured along edge 422C, of about 18 mm.

In general, the DQPSK demodulator 401 is configured to receive a DQPSK signal and convert it to four amplitude-modulated interference signals. Accordingly, in some embodiments, the DQPSK demodulator 401 performs four phase-stepped interferences. An exact free spectra range (FSR) may be specified by a customer which may be created by an optical path difference between a first optical path including R1 411 and a second optical path including R2 413. The path difference—e.g., the difference in the distance traveled by each beam in the different optical paths—determines the resulting FSR. Further, a 180° phase difference may be introduced by BD 419. Finally, an additional 90° phase difference may be introduced by a combination of the interferences created by the two optical path differences as well as an interference introduced by the QWP3 425, which may be configured to create a phase delay in two of the output signals.

As discussed in more detail below, when two signals, having the same frequency but different phases combine, the resulting combined signal is determined by the phase difference between waves in the two constituent signals—waves that are in-phase will undergo constructive interference, while waves that are out of phase will undergo destructive interference.

A. Example Operation

Figure 5A:
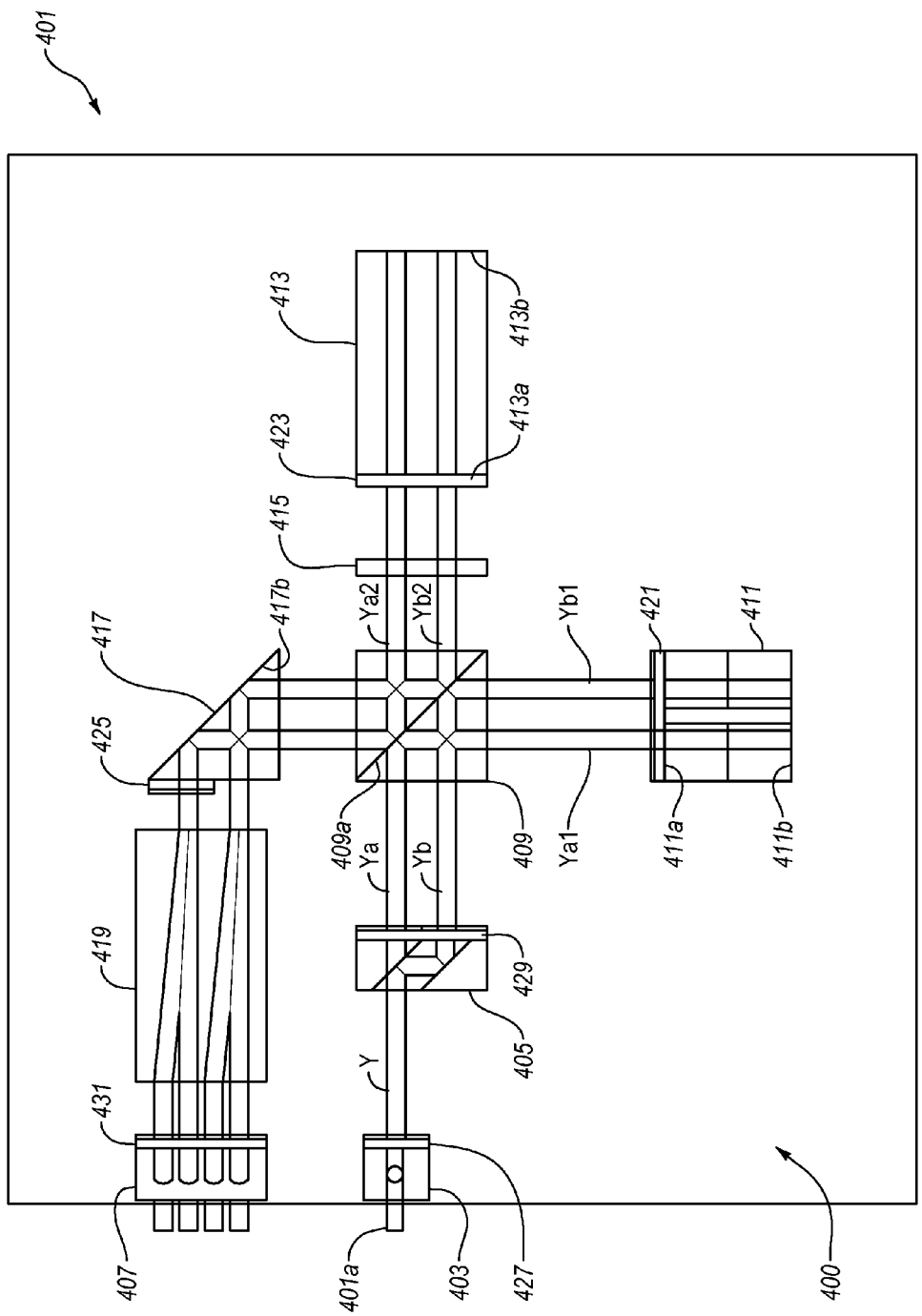
FIG. 5A illustrates an overhead view at an upper level of the DQPSK demodulator shown in FIG. 4 and the propagation of a first orthogonal component at the upper level of the DQPSK demodulator.
Figure 5B:
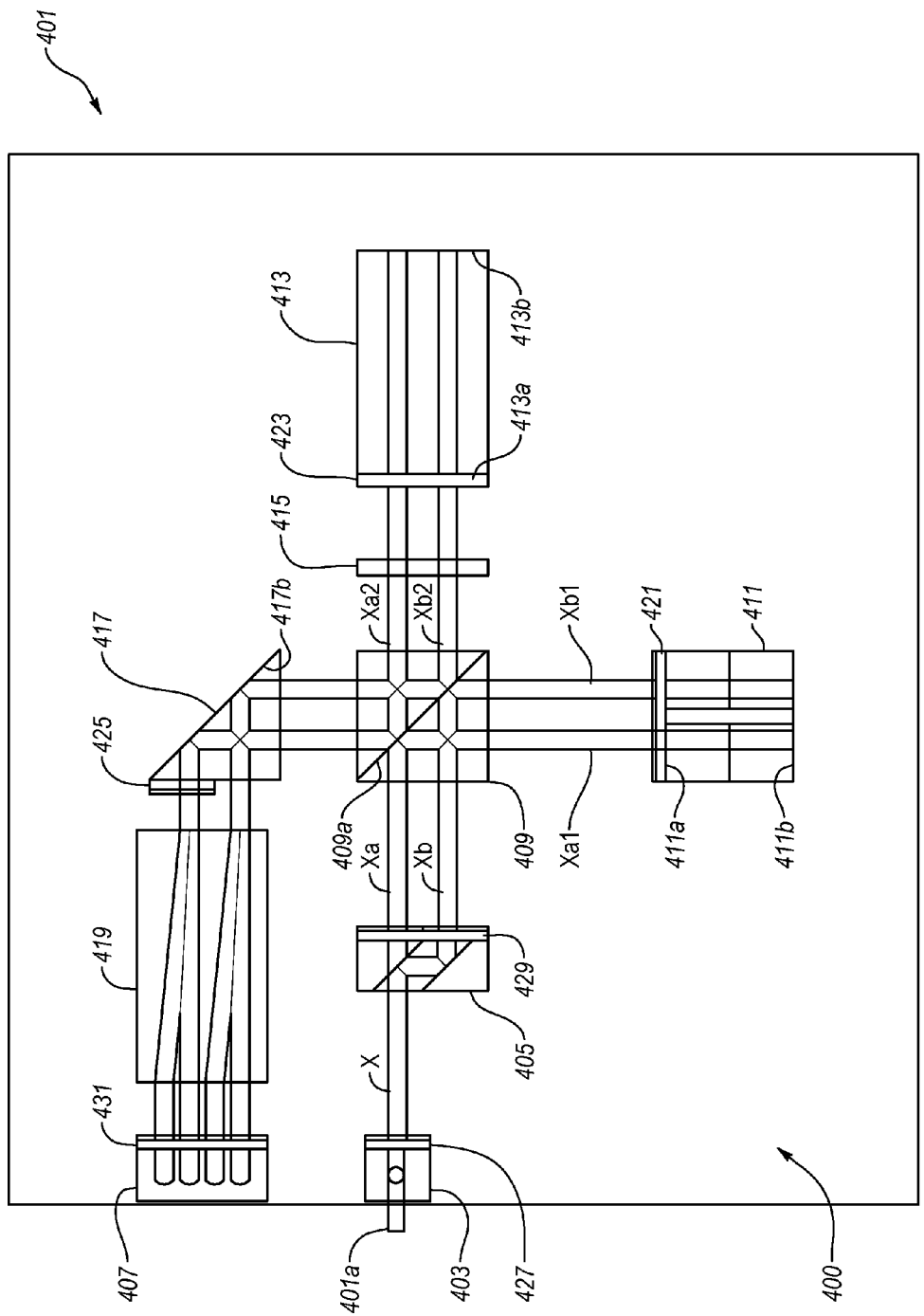
FIG. 5B illustrates an overhead view at a lower level of the DQPSK demodulator shown in FIG. 4 and the propagation of a second orthogonal component at the lower level of the DQPSK demodulator.

An example of the operation of the DQPSK demodulator 401 will now be described with combined reference to FIGS. 4, 5A-5G, and 6A-6C. FIGS. 5A and 5B illustrate overhead views at an upper level and a lower level, respectively, of the DQPSK demodulator 401 of FIG. 4 and the propagation of respective first and second orthogonal component signals Y (FIG. 5A) and X (FIG. 5B) of an input signal 401a. FIG. 5C illustrates a side view of IPBS 403 and IHWP 427 and an arbitrarily defined a-b coordinate system where the "a" axis is generally in a vertical direction, and the "b" axis is generally in a horizontal direction.

Figure 6A:
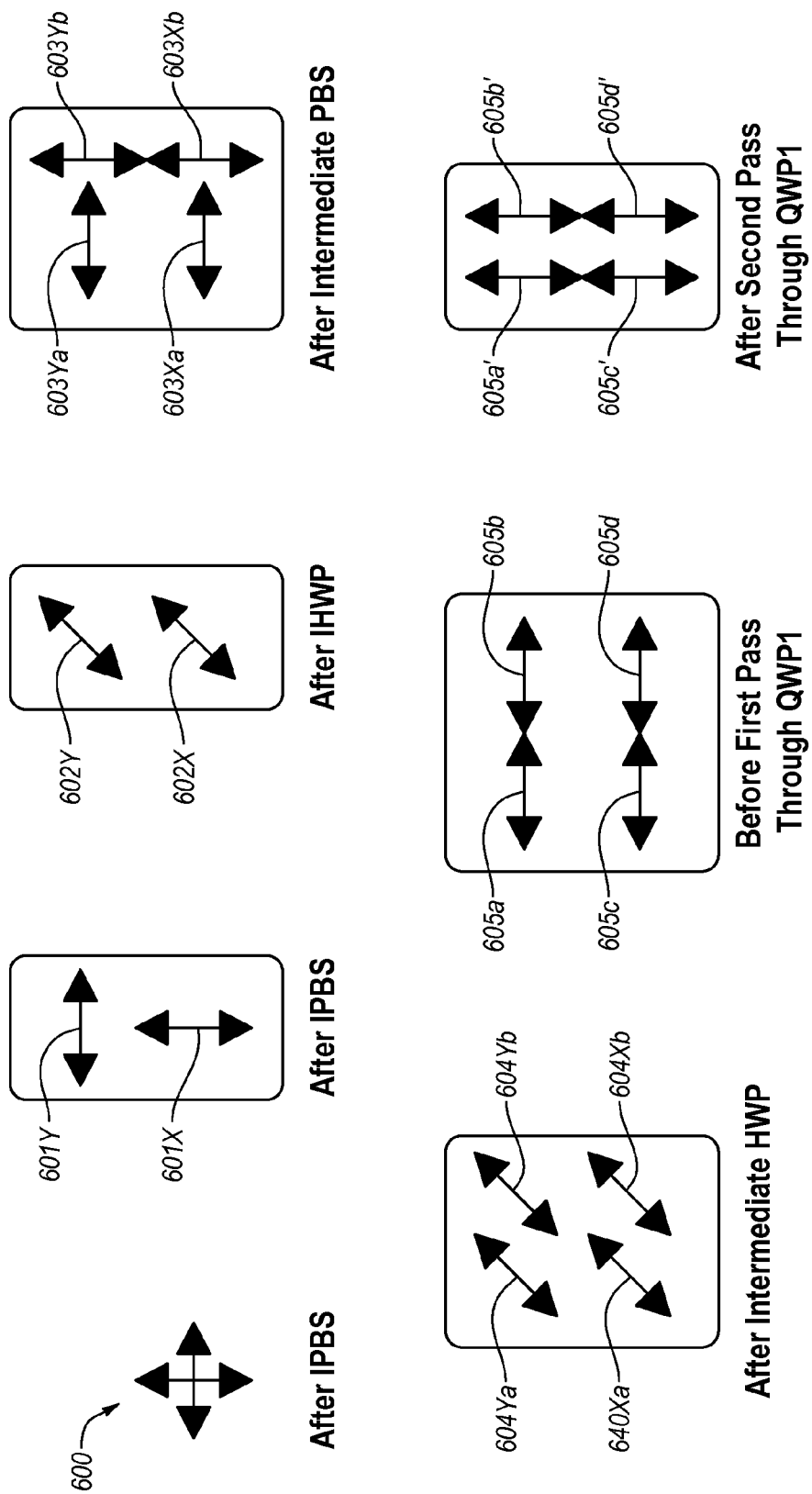

Referring to FIGS. 5A and 5B, the DQPSK demodulator 401 may be configured to receive an incoming optical signal 401a at the IPBS 403. Referring to FIG. 5C, at an input to the IPBS 403, the incoming optical signal 401a may have a polarization state denoted at 600 in FIG. 6A. The IPBS 403 may be configured to split the incoming optical signal 401a into the first and the second orthogonal component signals Y and X and to output the first and the second orthogonal component signals Y and X through the IHWP 427. The first and second orthogonal component signals Y and X are vertically displaced from and substantially parallel to each other. In FIG. 6A, the polarization state for each of the first and second orthogonal component signals Y and X after the split and prior to passing through the IHWP are respectively denoted at 601Y and 601X.

As illustrated in FIGS. 5A-5C, IPBS 403 may also have the IHWP 427 located at an output of IPBS 403. IHWP 427 may be configured to rotate the polarization state of the first and second orthogonal component signals Y and X. In some embodiments, the IHWP 427 may have two portions, a first portion through which the first orthogonal component signal Y passes and which may be oriented at about −22.5 degrees, and a second portion through which the second orthogonal component signal X passes and which may be oriented at about 22.5 degrees. As used herein, the term "oriented at" as applied to a waveplate, such as an HWP or a QWP, refers to the orientation of the optical axis angle of a waveplate crystal with respect to the signal. The polarization state of the second orthogonal component signal X after passing through the IHWP 427 is denoted at 602X in FIG. 6A, and the polarization state of the first orthogonal component signal Y after passing through the IHWP 427 is denoted at 602Y in FIG. 6A.

Referring to FIG. 5A, the first orthogonal component signal Y may continue to propagate through at the upper level of the various optical components 400 of the DQPSK demodulator 401 as shown in the overhead view of FIG. 5A. Referring to FIG. 5B, the second orthogonal component signal X may continue to propagate at the lower level of the various optical components 400 of the DQPSK demodulator 401 as shown in the overhead view of FIG. 5B.

Thus, with combined reference to FIGS. 5A and 5B, the first and second orthogonal component signals Y and X may then be provided to the intermediate PBS 405 which may be configured to split the first orthogonal component signal Y (FIG. 5A) and the second orthogonal component signal X (FIG. 5B). In particular, FIG. 5A depicts the first orthogonal component signal Y being split by the intermediate PBS 405 into orthogonal component signals Ya and Yb that are substantially parallel to and horizontally displaced from each other in the upper level. Likewise, FIG. 5B depicts the second orthogonal component signal X being split by the intermediate PBS 405 into orthogonal component signals Xa and Xb that are substantially parallel to and horizontally displaced from each other in the lower level. The four orthogonal component signals Ya, Yb, Xa, and Xb, after being split by intermediate PBS 405, may have polarization states denoted at 603Ya, 603Yb, 603Xa, and 603Xb, respectively, in FIG. 6A.

As illustrated in FIGS. 5A and 5B, the intermediate HWP 429 may be located at an output of intermediate PBS 405. In at least some example embodiments, the intermediate HWP 429 may have four portions, including a first portion through which Xa passes oriented at about −22.5 degrees, a second portion through which Xb passes oriented at about 22.5 degrees, a third portion through which Ya passes oriented at about −22.5 degrees, and a fourth portion through which Yb passes oriented at about 22.5 degrees. The intermediate HWP 429 may be configured to shift the polarization state of each of Ya, Yb, Xa, and Xb to have the polarization states denoted at 604Ya, 604Yb, 604Xa, and 604Xb respectively, in FIG. 6.

As illustrated in FIGS. 5A and 5B, the orthogonal component signals Ya, Yb, Xa, and Xb may then be provided to the CPBS 409. The CPBS 409 includes an interior surface 409a, which may be oriented at about a 45° angle with respect to a propagation direction of the orthogonal component signals Ya, Yb, Xa, and Xb in some embodiments. In particular, an angle of incidence of each of the orthogonal component signals Ya, Yb, Xa, and Xb at the interior surface 409a may be about 45° with respect to the normal of the interior surface 409a. The interior surface 409a may be configured to split the orthogonal component signals Ya, Yb, Xa and Xb by reflecting a first polarization component of each of the orthogonal component signals Ya, Yb, Xa, and Xb through a 90° angle, and by transmitting a second polarization component of each of the orthogonal component signals Ya, Yb, Xa, and Xb therethrough. For example, the orthogonal component signal Ya may be separated into orthogonal component signals Ya1 and Ya2, where Ya1 may be reflected 90° from the angle of incidence into the first optical path, and Ya2 may be transmitted through the interior surface 409a into the second optical path. Thus, CPBS 409 separates, at the interior surface 409a of the CPBS 409, the four orthogonal component signals Ya, Yb, Xa, Xb into eight orthogonal component signals Ya1, Ya2, Yb1, Yb2, Xa1, Xa2, Xb1 and Xb2.

Four orthogonal component signals including Ya1, Yb1 (FIG. 5A), Xa1 and Xb1 (FIG. 5B) travel in the first optical path including R1 411. The orthogonal component signals Ya1, Yb1, Xa1 and Xb1 travel through QWP1 421, are reflected by R1 411, and return through QWP1 421 to the interior surface 409a of the CPBS 409. Before reaching QWP1 421, the orthogonal component signals Ya1, Yb1, Xa1, and Xb1 may have the polarization states denoted in FIG. 6A at 605a for Ya1, 605b for Yb1, 605c for Xa1, and 605d for Xb1.

Referring again to FIGS. 5A and 5B, R1 411 may have a first substantially non-reflective surface 411a (hereinafter "first surface 411a") and a second substantially reflective surface 411b (hereinafter "second surface 411b"). The QWP1 421 may be located on or near the first surface 411a. In at least some example embodiments, QWP1 421 may be oriented at about 45 degrees. QWP1 421 may be configured to rotate the polarization state by 90° for each signal passing through it two times as described below.

After passing through the QWP1 421 once, Ya1, Yb1 (FIG. 5A), and Xa1, Xb1 (FIG. 5B) may pass through the first surface 411a of R1 411 and may be reflected by the second surface 411b of R1 411. After being reflected by the second surface 411b, Ya1, Yb1, Xa1, and Xb1 may pass through the QWP1 421 a second time. The net change in the polarization state of each of Ya1, Yb1, Xa1, and Xb1 after passing through the QWP1 421 the first time, being reflected by second surface 411b, and passing through the QWP1 421 the second time may be 90°. Thus, after passing through QWP1 the second time, Ya1, Yb1, Xa1, and Xb1 may have a polarization state denoted in FIG. 6A at 605a' for Ya1, 605b' for Yb1, 605c' for Xa1, and 605d' for Xb1 in FIG. 6A. Ya1, Yb1, Xa1, and Xb1 may then re-enter CPBS 409 where each of Ya1, Yb1, Xa1, and Xb1 may recombine at the interior surface 409a of the CPBS 409 with a corresponding one of the four orthogonal component signals traveling in the second optical path including Ya2, Yb2 (FIG. 5A) and Xa2, Xb2 (FIG. 5B).

In the second optical path, Ya2, Yb2 (FIG. 5A) and Xa2, Xb2 (FIG. 5B) may be transmitted through the interior surface 409a of CPBS 409, through the silicon plate 415, through the QWP2 423, and may be reflected by R2 413 before returning to the interior surface 409a through the QWP2 423 and the silicon plate 415. Before reaching QWP2 423, Ya2, Yb2, Xa2, Xb2 may have polarization states denoted at 606a for Ya2, 606b for Yb2, 606c for Xa2, and 606d for Xb2 in FIG. 6B.

Referring again to FIGS. 5A and 5B, R2 413 may have a first substantially non-reflective surface 413a (hereinafter "first surface 413a") and a second substantially reflective surface 413b (hereinafter "second surface 413b"). The QWP2 423 may be located on or near the first surface 413a. QWP2 423 may be oriented at about 45 degrees. QWP2 423 may be configured to shift the polarization state by 90° for each of Ya2, Yb2 (FIG. 5A) and Xa2, Xb2 (FIG. 5B) after passing through QWP2 423 two times as described in more detail below.

After exiting the CPBS 409, each of Ya2, Yb2, Xa2, and Xb2 may pass through the silicon plate 415, the QWP2 423, and the first surface 413a to enter R2 413, whereupon each of Ya2, Yb2, Xa2, and Xb2 may then be reflected by the second surface 413b of R2 413. After reflection by the second surface 413b, Ya2, Yb2, Xa2, and Xb2 may pass through QWP2 423 a second time where the polarization state of each of Ya2, Yb2, Xa2, and Xb2 may be rotated by 90°. At the output of QWP2 423 after passing through it the second time, Ya2, Yb2, Xa2, and Xb2, may have a polarization state denoted in FIG. 6B at 606a' for Ya2, 606b' for Yb2, 606c' for Xa2, and 606d' for Xb2.

From the output of QWP2 423, Ya2, Yb2 (FIG. 5A) and Xa2, Xb2 (FIG. 5B) may again pass through the silicon plate 415 before reaching the CPBS 409. Ya2, Yb2, Xa2, Xb2 may then re-enter CPBS 409 where each signal will recombine with the four orthogonal component signals from the first optical path including Ya1, Yb1, Xa1, and Xb1 at the interior surface 409a of the CPBS 409 to create four orthogonal signal pairs Ya1+Ya2, Xa1+Xa2, Yb1+Yb2, and Xb1+Xb2.

In other words, the four orthogonal component signals including Ya1, Yb1, Xa1, Xb1 from the first optical path, and the four orthogonal component signals including Ya2, Yb2, Xa2, Xb2 from the second optical path may be incident on the interior surface 409a of CPBS 409. At this point, the four orthogonal component signals including Ya1, Yb1, Xa1, Xb1 originally reflected by the interior surface 409a may be transmitted through the interior surface 409a, and the four orthogonal component signals including Ya2, Yb2, Xa2, Xb2 originally transmitted by the interior surface 409a may be reflected by the interior surface 409a due to the polarization state rotations provided by a corresponding one of QWP1 421 or QWP2 423.

Figure 5E:
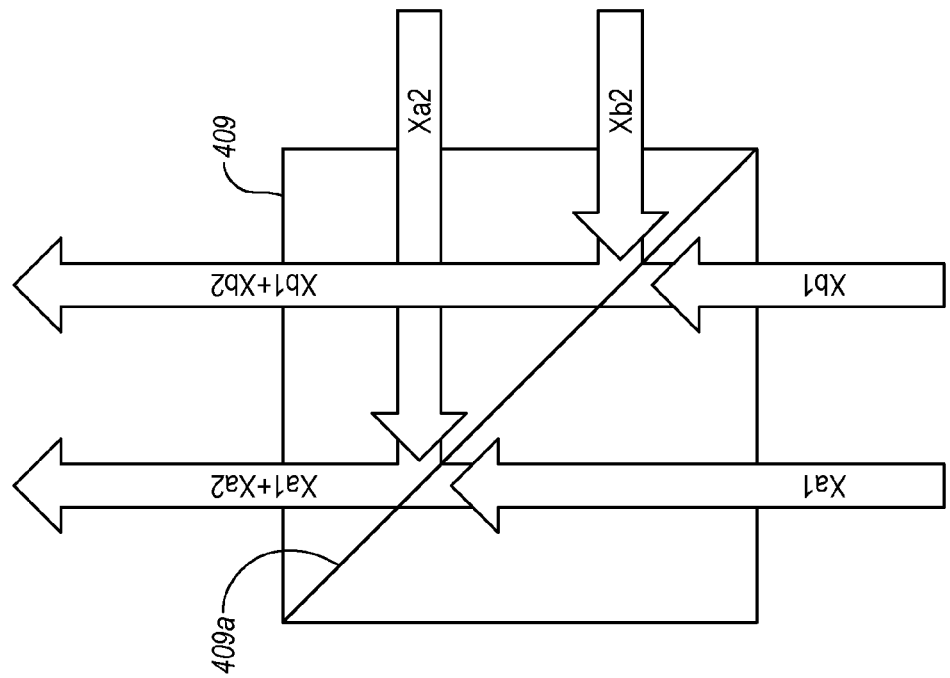
FIGS. 5D-5E illustrate overhead views of a cubical polarization beam splitter at the same upper and lower levels of FIGS. 5A and 5B, and the propagation of signals through the cubical polarization beam splitter at the upper and lower levels.
Figure 5D:
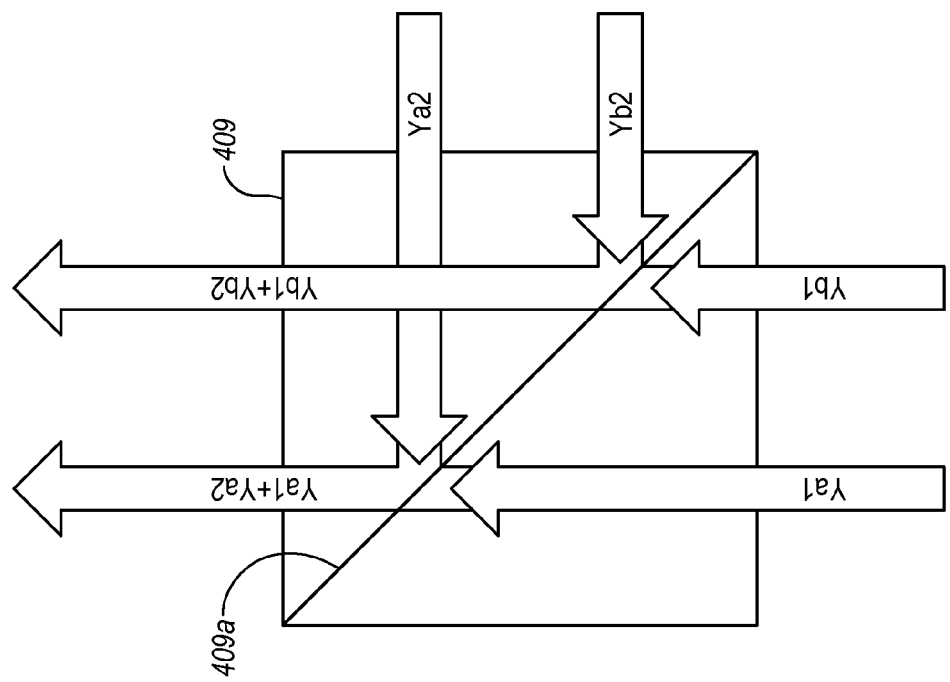

As illustrated in FIG. 5D, Ya1 and Yb1 returning from the first optical path respectively recombine at the upper level of CPBS 409 at interior surface 409a with Ya2 and Yb2 returning from the second optical path to form respective orthogonal signal pairs Ya1+Ya2 and Yb1+Yb2. As illustrated in FIG. 5E, Xa1 and Xb1 returning from the first optical path respectively recombine at the lower level of CPBS 409 at interior surface 409a with Xa2 and Xb2 returning from the second optical path to form respective orthogonal signal pairs Xa1+Xa2 and Xb1+Xb2.

The first and second optical paths have an optical path difference to create a phase delay between the components in each orthogonal signal pair. In these and other embodiments, R1 411 and R2 413 may be composed of the same or different materials and have the same or different physical dimensions. For instance, R1 411 may be composed of SF-11 glass, while R2 413 may be composed of silicon glass. Whereas the optical path length of each optical path may depend on both the distance covered by each optical path and the index of refraction of the materials disposed in each optical path, the dimensions of and materials used for each component, such as R1 411 and R2 413, may be selected such that the first optical path has an optical path length L, and the second optical path has an optical path length L−ΔL. The predetermined difference ΔL may be configured to introduce a delay of one bit period between Ya1, Yb1, Xa1, and Xb1 of the first optical path, and their respective orthogonal counterparts Ya2, Yb2, Xa2, and Xb2 of the second optical path.

As mentioned above, the DQPSK demodulator 401 may have an athermal design. In some embodiments, the ambient temperature of the DQPSK demodulator 401, including components R1 411, R2 413, QWP1 421, QWP2 423, may vary during operation. The varying temperature changes could introduce changes in the optical path length L of the first optical path, and/or changes in the optical path length L−ΔL of the second optical path. However, a change in the optical path length L of the first optical path without a proportionate change in the optical path length L−ΔL of the second optical path could introduce a temperature dependent phase delay of more or less than one bit period between signals that travel on the first optical path and signals that travel on the second optical path. Therefore, in some embodiments, R1 411 and R2 413 are configured to experience the same changes caused by the coefficient of thermal expansion and thermal-optic coefficient so as to be thermally matched. Being thermally matched, temperature-induced changes in R1 411 which affect the optical path length L of the first optical path may be proportionate to temperature-induced changes in R2 413 which affect the optical path length L−ΔL of the second optical path, so as to substantially maintain ΔL at a fixed value.

The silicon plate 415 may be operated to tune the DQPSK demodulator 401 to a predetermined central wavelength. In particular, the silicon plate 415 may be configured as a central wavelength tuning device by coupling the silicon plate 415 to one or more thermoelectric coolers ("TECs") or heaters configured to control a temperature of the silicon plate 415. By adjusting the temperature of the silicon plate 415 up or down, the central wavelength may be adjusted a corresponding amount. Thus, the silicon plate 415 may be configured to tune the DQPSK demodulator 401 to a predetermined temperature dependent central wavelength.

Figure 5G:
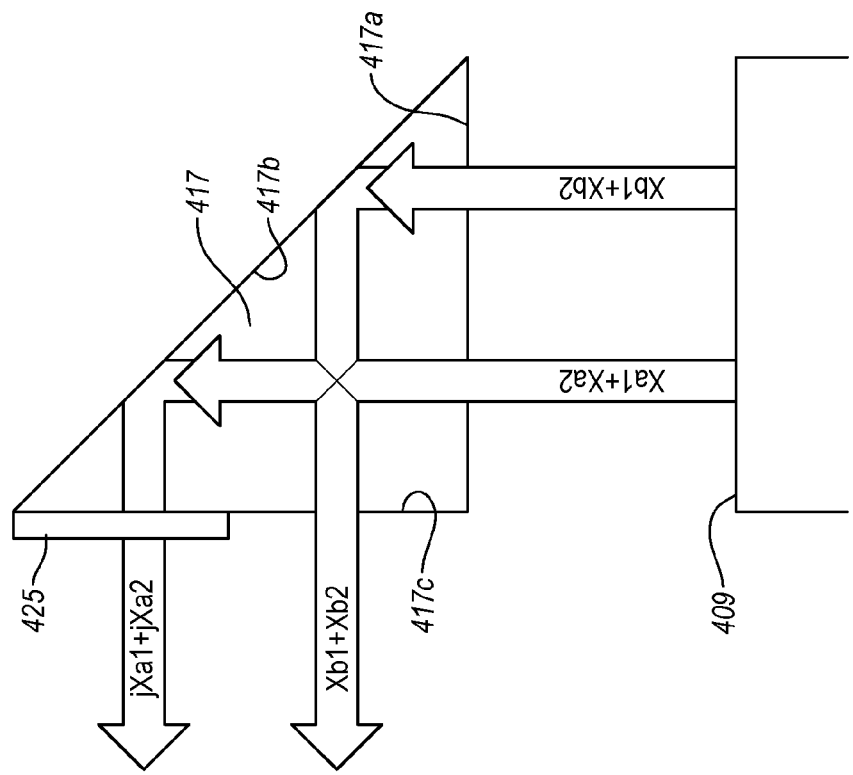
FIGS. 5F-5G illustrate overhead views of a redirecting element, a third quarter waveplate, and the cubical polarization beam splitter at the same upper and lower levels of FIGS. 5A and 5B, and propagation of signals through the redirecting element, the third quarter waveplate, and the cubical polarization beam splitter at the upper and lower levels.
Figure 5F:
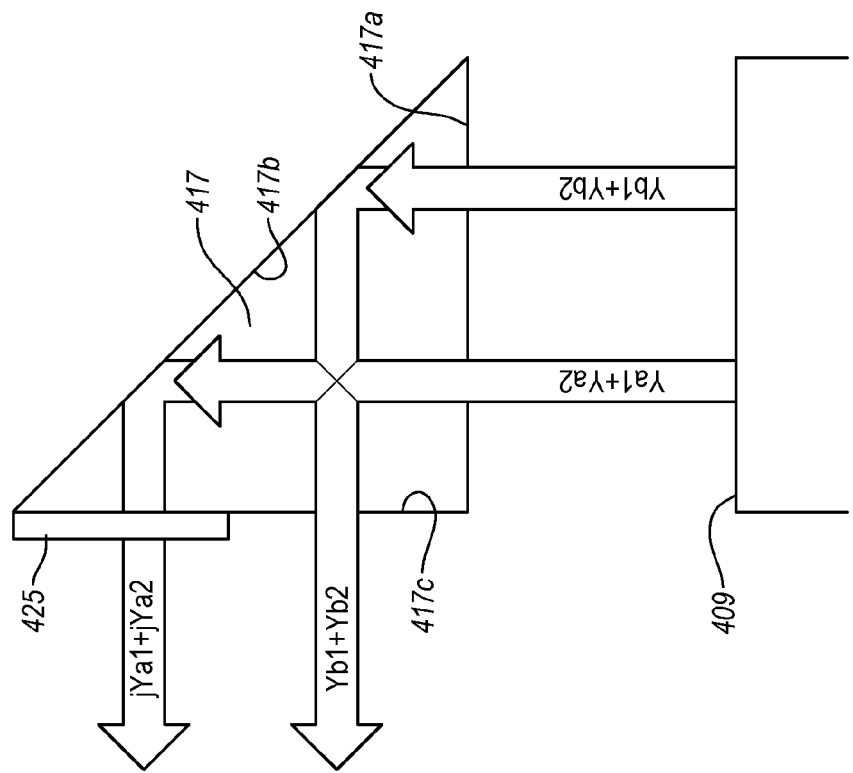
Figure 5I:
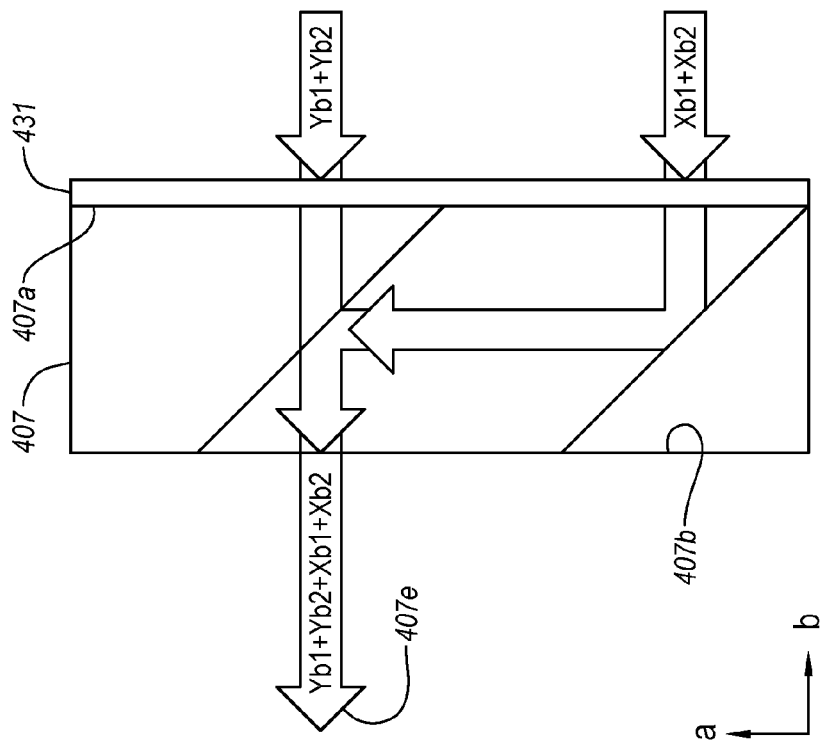

As illustrated in FIGS. 5F, 5G, and 6B, the four orthogonal signal pairs including Ya1+Ya2, Xa1+Xa2, Yb1+Yb2, and Xb1+Xb2, may be provided from CPBS 409 to the RAR 417. FIG. 5F is an overhead view at the upper level of RAR 417 and QWP3 425. FIG. 5G is an overhead view at the lower level of RAR 417. RAR 417 may be composed of a material substantially transparent to light. The RAR 417 may also include a substantially non-reflective input surface 417a (hereinafter "input surface 417a"), a substantially reflective surface 417b (hereinafter "reflective surface 417b"), and a substantially non-reflective output surface 417c (hereinafter "output surface 417c") as shown in FIGS. 5F and 5G.

In the illustrated embodiment, the redirecting element is implemented as the RAR 417 with the reflective surface 417b disposed on the hypotenuse of the RAR 417. The reflective surface 417b of the RAR 417 may be oriented at a 45° angle relative to the axis defined by the direction of travel of an incoming signal. The reflective surface 417b may include a reflective coating causing all incoming signals within a predetermined frequency band to be substantially reflected. In addition, the QWP3 425 may be disposed on or near the output surface 417c of the RAR 417.

As shown in FIGS. 5F and 5G, the four orthogonal signal pairs including Ya1+Ya2, Xa1+Xa2, Yb1+Yb2, and Xb1+Xb2 may enter the RAR 417 through the input surface 417a. The four orthogonal pairs including Ya1+Ya2, Xa1+Xa2, Yb1+Yb2, and Xb1+Xb2 may then be reflected by the reflective surface 417b toward the output surface 417c. After reflection by the reflective surface 417b of the RAR 417, two of the four orthogonal signal pairs, specifically Ya1+Ya2 and Xa1+Xa2, may be transmitted through QWP3 425, thereby introducing a n/2 phase shift in those two orthogonal signal pairs now identified as jYa1+jYa2 and jXa1+jXa2. In these and other embodiments, the "j" designates a phase shift introduced by QWP3 425. The polarization states of the phase shifted orthogonal signal pairs jYa1+jYa2 and jXa1+jXa2 are denoted at 607a for jYa1+jYa2 and 607c for jXa1+jXa2 in FIG. 6B.

Additionally or alternatively, the orthogonal signal pairs Yb1+Yb2 and Xb1+Xb2 may be provided by the CPBS 409, may pass through the input surface 417a, be reflected by the reflective surface 417b towards the output surface 617c, and may exit the RAR 417 through the output surface 417c. The orthogonal signal pairs Yb1+Yb2 and Xb1+Xb2 do not pass through and are therefore not shifted by the QWP3 425. The polarization states of the two un-shifted orthogonal signal pairs are denoted at 607b for Yb1+Yb2, and 607d for Xb1+Xb2 in FIG. 6B.

As illustrated in FIGS. 4-5B, the BD 419 is positioned to receive the orthogonal signal pairs jYa1+jYa2, jXa1+jXa2, Yb1+Yb2, and Xb1+Xb2 from the RAR 417 and the QWP3 425. As illustrated in FIG. 5A, the Y-related orthogonal signal pairs including jYa1+jYa2 and Yb1+Yb2 are received by the BD 419 at the upper level, and the BD 419 may be configured to split the Y-related orthogonal signal pairs into four distinct orthogonal components jYa1+jYa2, jYa1−jYa2, Yb1+Yb2, and Yb1−Yb2. As illustrated in FIG. 5B, the X-related orthogonal signal pairs jXa1+jXa2 and Xb1+Xb2 are received by the BD 419 at the lower level, and the BD 419 may be configured to split the X-related pairs into four distinct orthogonal components jXa1+jXa2, jXa1−jXa2, Xb1+

Xb2, and Xb1−Xb2. The polarization states of the eight distinct orthogonal components are denoted in FIG. 6B at 608a for jYa1+jYa2, 608b for jYa1−jYa2, 608c for Yb1+Yb2, 608d for Yb1−Yb2, 608e for jXa1+jXa2, 608f for jXa1−jXa2, 608g for Xb1+Xb2, and 608h for Xb1−Xb2.

As shown in FIGS. 5A and 5B, the OHWP 431 and OPBS 407 are positioned to receive the output of BD 419. With combined reference to FIGS. 5H-5K, the distinct orthogonal components jYa1+jYa2, jYa1−jYa2, Yb1+Yb2, Yb1−Yb2, jXa1+jXa2, jXa1−jXa2, Xb1+Xb2, and Xb1−Xb2 may be provided to OHWP 431 and OPBS 407. The OHWP 431 and OPBS 407 are illustrated in FIGS. 5H-5K in the arbitrarily-defined a-b coordinate system where the "a" axis is generally in a vertical direction and the "b" axis is generally in a horizontal direction.

As shown in each of FIGS. 5H-5K, OPBS 407 may have a substantially non-reflective input surface 407a (hereinafter "input surface 407a") and a substantially non-reflective output surface 407b (hereinafter "output surface 407b"). OHWP 431 is disposed on or near the input surface 407a of the OPBS 407. The OHWP 431 may be configured to shift the polarization state of each of the distinct orthogonal components jYa1−jYa2, Yb1−Yb2, jXa1+jXa2 and Xb1+Xb2 by 90° in some embodiments, while not affecting the polarization states of the distinct orthogonal components jYa1+jYa2, Yb1+Yb2, jXa1−jXa2 and Xb1−Xb2 The polarization states of the eight distinct orthogonal components after passing through OHWP 431 are denoted in FIG. 6B at 609a for jYa1+jYa2, 609b for jYa1−jYa2, 609c for Yb1+Yb2, 609d for Yb1−Yb2, 609e for jXa1+jXa2, 609f for jXa1−jXa2, 609g for Xb1+Xb2, and 609h for Xb1−Xb2. The OHWP 431 may have portions oriented at different angles such that each of the eight distinct orthogonal components jYa1+jYa2, jYa1−jYa2, Yb1+Yb2, Yb1−Yb2, jXa1+jXa2, jXa1−jXa2, Xb1+Xb2, and Xb1−Xb2 may be variously rotated accordingly. The distinct orthogonal components may be variously rotated such that jYa1+jYa2 is orthogonal to jXa1+jXa2, jYa1−jYa2 is orthogonal to jXa1−jXa2, Yb1+Yb2 is orthogonal to Xb1+Xb2, and Yb1−Yb2 is orthogonal to Xb1−Xb2.

In at least some example embodiments, and as already mentioned, OHWP 431 may have eight portions, including a first portion through which the signal component jYa1+jYa2 passes and oriented at about 0 degrees, a second portion through which the signal component jYa1−jYa2 passes and oriented at about 45°, a third portion through which Yb1+Yb2 passes and oriented at about 0°, a fourth portion through which Yb1−Yb2 passes and oriented at about 45° degrees, a fifth portion through which jXa1+jXa2 passes and oriented at about 45°, a sixth portion through which jXa1−jXa2 passes and oriented at about 0°, a seventh portion through which Xb1+Xb2 passes and oriented at about 45°, and an eighth portion through which Xb1−Xb2 passes and oriented at about 0°.

After each of the eight distinct orthogonal components jYa1+jYa2, jYa1−jYa2, Yb1+Yb2, Yb1−Yb2, jXa1+jXa2, jXa1−jXa2, Xb1+Xb2, and Xb1−Xb2 have passed through OHWP 431 and are provided to OPBS 407, the OPBS 407 may then combine each of the four distinct orthogonal components jYa1+jYa2, jYa1−jYa2, Yb1+Yb2, and Yb1−Yb2 from the upper level with a corresponding one of the four distinct orthogonal components jXa1+jXa2, jXa1−jXa2, Xb1+Xb2, and Xb1−Xb2 from the lower level to produce a total of four output signals 407d-407g respectively illustrated in FIGS. 5H-5K.

Figure 5H:
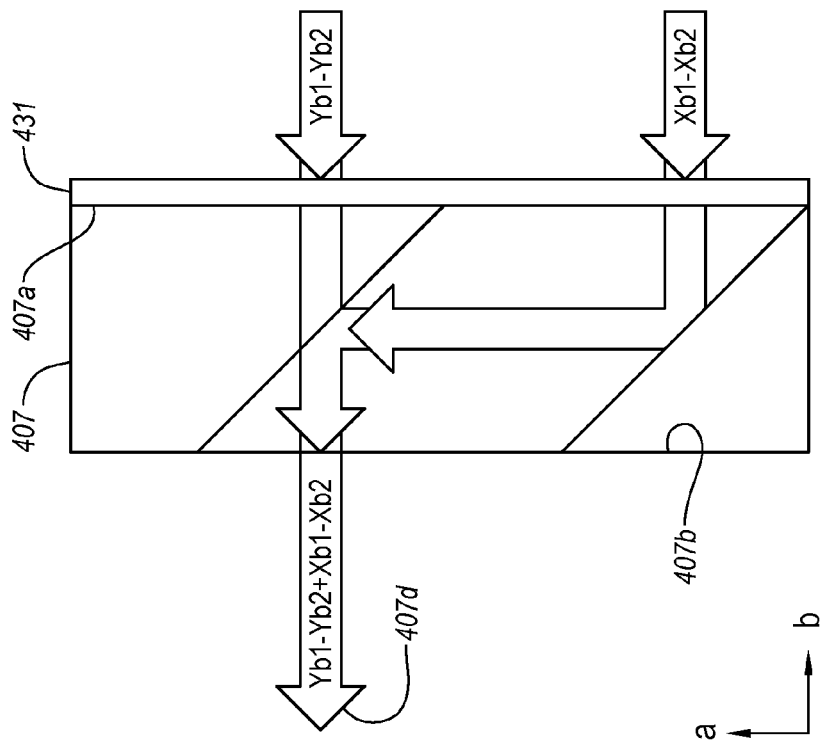

In particular Yb1−Yb2 may be combined with the orthogonal component below it, e.g., Xb1−Xb2, to produce the output signal Yb1−Yb2+Xb1−Xb2 denoted at 407d in FIG. 5H. Additionally, Yb1+Yb2 may be combined with the orthogonal component below it, e.g., Xb1+Xb2, to produce the output signal Yb1+Yb2+Xb1+Xb2 denoted at 407e in FIG. 5I. Additionally, jYa1−jYa2 may be combined with the orthogonal component below it, e.g., jXa1−jXa2, to produce the output signal jYa1−jYa2+jXa1−jXa2 denoted at 407f in FIG. 5J. Additionally, jYa1+jYa2 may be combined with the orthogonal component below it, e.g., jXa1+jXa2, to produce the output signal jYa1+jYa2+jXa1+jXa2 denoted at 407g in FIG. 5K. The polarization states of the four output signals 407e-407g are denoted in FIG. 6C at 610a for signal jYa1+jYa2+jXa1+jXa2 407g, 610b for jYa1−jYa2+jXa1−jXa2 407f, 610c for Yb1+Yb2+Xb1+Xb2 407e, and 610d for Yb1−Yb2+Xb1−Xb2 407d. In each of the four output signals 407d-407g, the distinct orthogonal components constructively and/or destructively interfere with each other to produce amplitude modulation in the corresponding output signal 407d-407g that may be detected by a corresponding optical receiver.

Finally, the four output signals jYa1+jYa2+jXa1+jXa2 407g, jYa1−jYa2+jXa1−jXa2 407f, Yb1+Yb2+Xb1+Xb2 407e, and Yb1−Yb2+Xb1−Xb2 407d may be provided to a collimated ribbon array such as the collimated ribbon array 307 shown in FIG. 3. The collimated ribbon array may be connected to a receiver array (not shown) configured to convert the four output signals 407d-407g to electrical signals, which may then be communicated to a host (not shown).

Accordingly, as disclosed herein, the DQPSK demodulator 401 is configured to receive a phase-modulated DQPSK signal and convert it to four amplitude-modulated signals. In some embodiments, the phase-modulated DQPSK signal has a 40 gigabit per second ("G") data rate, and each of the four amplitude-modulated signals has a 10G data rate. Alternately, the data rate of the phase-modulated DQPSK signal and of each of the final four amplitude-modulated signals may be different than 40G and 10G, respectively.

III. Example DPSK Demodulator System

Figure 7A:
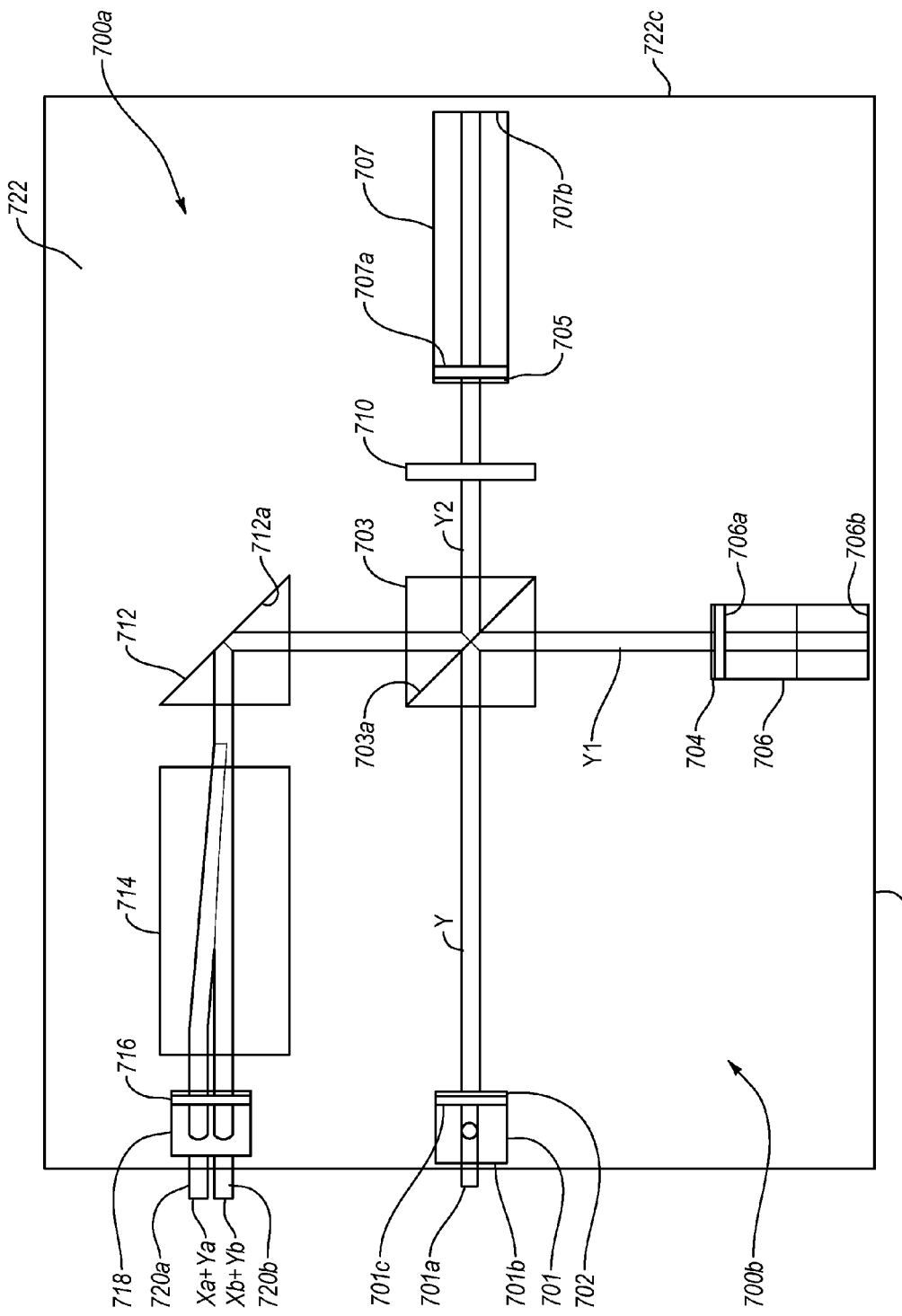
FIG. 7A illustrates an overhead view at an upper level of a DPSK demodulator that may be implemented in the fiber optic communication system of FIG. 1, and the propagation of a first orthogonal component at the upper level of the DPSK demodulator.
Figure 7B:
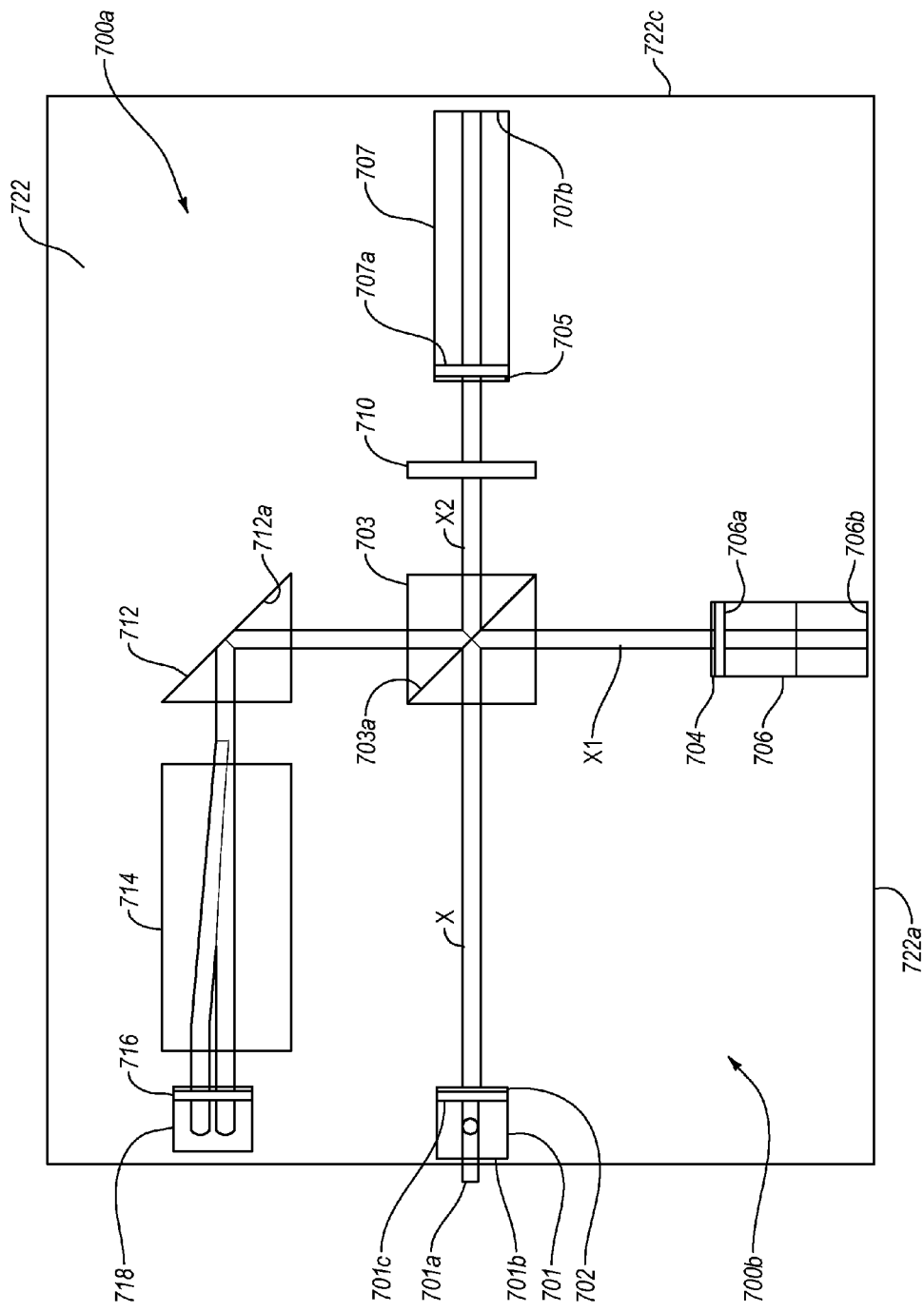
FIG. 7B illustrates an overhead view at a lower level of the DPSK demodulator depicted in FIG. 7A, and the propagation of a second orthogonal component at the lower level of the DPSK demodulator.

Referring to FIGS. 7A and 7B, an example embodiment of a DPSK demodulator 700a suitable for use in the fiber optic communication system 100 of FIG. 1 is disclosed. For instance, DPSK demodulator 700a may correspond to the demodulator 108 of FIG. 1. FIG. 7A depicts an overhead view at an upper level of the DPSK demodulator 700a. FIG. 7B depicts an overhead view at a lower level of the DPSK demodulator 700a. Various optical components 700b may be implemented in the DPSK demodulator 700a.

The optical components 700b shown in FIG. 7 can be arranged to receive an input modulated signal from a collimator, such as the collimator 305 shown in FIG. 3. The optical components 700b shown in FIG. 7 can also be positioned to deliver an output demodulated signal to a collimated ribbon array, such as the collimated ribbon array 307 of FIG. 3. The DPSK demodulator 700a may include an IPBS 701 and an OPBS 718. A BD 714 is also provided. The DPSK demodulator 700a may also include a CPBS 703, R1 706, R2 707, a silicon plate 710, and a redirecting element such as a RAR 712. The DPSK demodulator 700a may also include a QWP1 704, a QWP2 705, an IHWP 702, and an OHWP 716.

R1 706 and R2 707 may generally be configured in a similar or analogous manner as described above with respect to R1 411 and R2 413 of FIGS. 4-5B. For instance, R1 706 and R2 707 may be thermally matched and may provide the DPSK demodulator 700a with an athermal design such that changes in environmental temperature and in the components of the DPSK demodulator 700 do not affect the functionality of the DPSK demodulator.

Optionally, the foregoing components of the DPSK demodulator 700a may be formed on, or otherwise coupled to, a substrate 722. The substrate 722 may include fused silica or other suitable substrate material. In some embodiments, the substrate may have a length, e.g., as measured along edge 722A, of about 15 mm, a width, e.g., as measured along edge 722C, of about 14 mm, and a height, e.g., as measured along an edge normal to a plane defined by edges 722a and 722c, of about 2 mm.

The components and function of the DPSK demodulator 700a are similar in some respects to those of the DQPSK demodulator 401 described above. For example, the DPSK demodulator 700a may be configured to receive and split an optical signal into two optical paths to introduce an optical path difference. Additionally, the IPBS 701, the IHWP 702, the CPBS 702, R1 706, QWP1 704, silicon plate 710, R2 707, QWP2 705, RAR 712, BD 714, OHWP 716 and OPBS 718 of the DPSK demodulator 700a of FIGS. 7A and 7B may generally correspond and perform similar or analogous functions to, respectively, IPBS 403, the IHWP 427, the CPBS 409, R1 411, QWP1 421, silicon plate 415, R2 413, QWP2 423, RAR 417, BD 419, OHWP 431 and OPBS 407 of the DQPSK demodulator 401 of FIGS. 4-5B. However, the QWP3 425, the intermediate PBS 405, and the intermediate HWP 429 of the DQPSK demodulator 401 are omitted from the DPSK demodulator 700a. Additionally or alternatively, instead of an output of four signals as provided by the DQPSK demodulator 401 of FIGS. 4-5B, the DPSK demodulator 700a may output two signals.

In general, the DPSK demodulator 700a may be configured to receive a DPSK signal and convert it to two amplitude-modulated interference signals. Accordingly, in some embodiments, the DPSK demodulator 700a performs two phase-stepped interferences. An exact FSR may be specified by a customer, which FSR may be created by an optical path difference of signals traveling between a first optical path including R1 706, and a second optical path including R2 707. The path difference—e.g., the difference in the distance traveled by each beam in the different optical paths—determines the resulting FSR. Thus, a phase delay will be introduced by the optical path difference in the DPSK demodulator 700a in a similar manner as in the DQPSK demodulator 401 described above. Further, a 180° phase difference may be introduced by the BD 714. However, unlike the DQPSK demodulator 401 described above, an additional 90° phase difference will not be introduced by a third quarter wave plate such as the QWP3 425 described above. Thus, the DPSK demodulator 700a may instead provide two output signals rather than four output signals as provided by the DQPSK demodulator 401 described above.

A. Example Operation

Figure 7C:
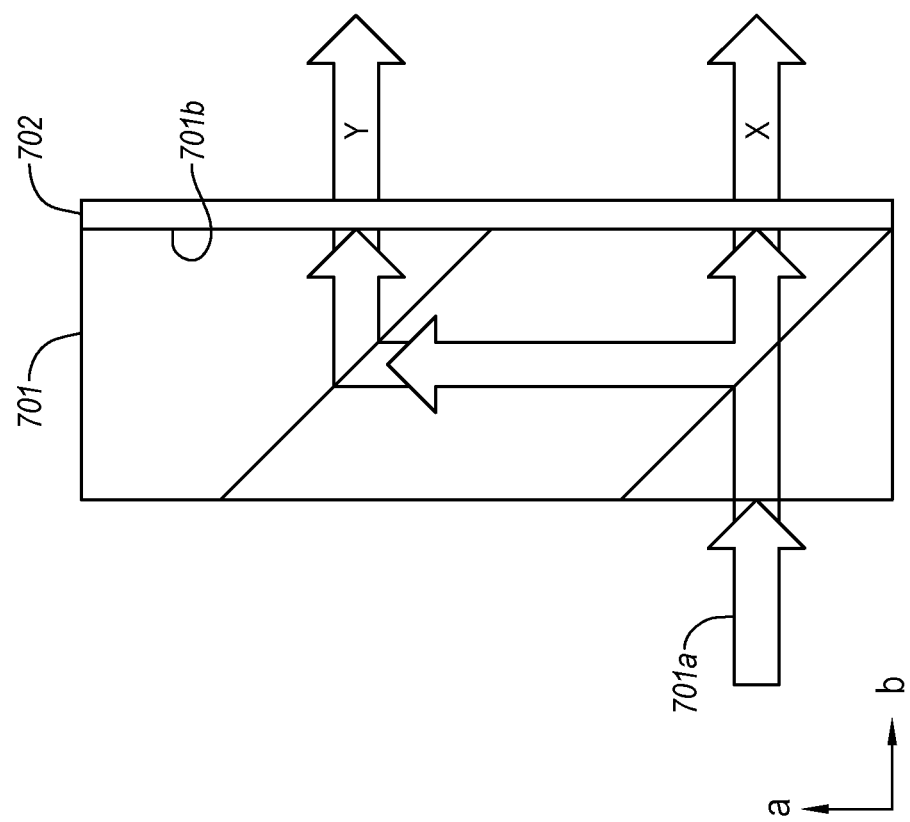
FIG. 7C illustrates a side view of an input polarization beam splitter and an input half waveplate of the DPSK demodulator of FIGS. 7A and 7B, and the propagation of a signal through the input polarization beam splitter and the input half waveplate.

An example operation of the DPSK demodulator 700a will now be described with combined reference to FIGS. 7A-7E. FIGS. 7A and 7B illustrate the propagation of respective first and second orthogonal component signals Y (FIG. 7A) and X (FIG. 7B) of an incoming optical signal 701a (FIG. 7A and FIG. 7B). FIG. 7C illustrates a side view of IPBS 701 and IHWP 702 and an arbitrarily defined a-b coordinate system where the "a" axis is generally in the vertical direction, and the "b" axis is generally in the horizontal direction.

Figure 8:
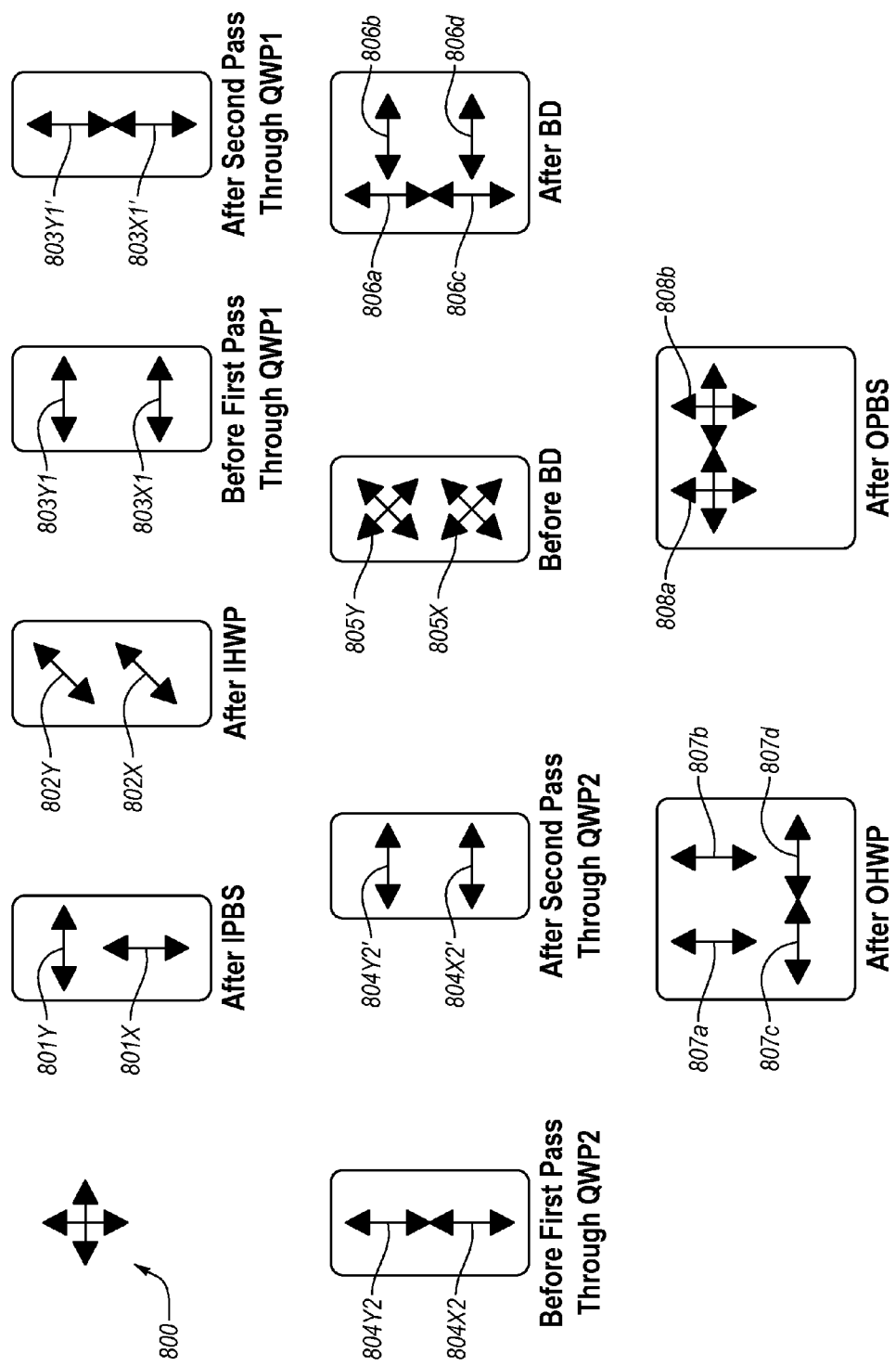
FIG. 8 illustrates various polarization states of signals propagating through the components of the DPSK demodulator of FIGS. 7A and 7B.

Referring to FIGS. 7A-7C, the DPSK demodulator 700a may be configured to receive the incoming optical signal 701a. At an input to the IPBS 701, the incoming optical signal 701a may have a polarization state denoted at 800 in FIG. 8. The IPBS 701 may be configured to split the incoming optical signal 701a into the first and the second orthogonal component signals Y and X and to output the first and the second orthogonal component signals Y and X through the IHWP 702. The first and second orthogonal component signals Y and X are vertically displaced from and substantially parallel to each other after exiting the IHWP 702. In FIG. 8, the polarization state for each of the first and second orthogonal component signals Y and X after the split by IPBS 701 and prior to passing through the IHWP 702 are respectively denoted at 801Y and 801X.

As illustrated in FIGS. 7A-7C, IPBS 701 may have a substantially non-reflective output surface 701b (hereinafter "output surface 701b"). IHWP 702 may be disposed on or near the output surface 701b of IPBS 701. IHWP 702 may be configured to rotate the polarization state of the first orthogonal component signal Y and the second orthogonal component signal X. In some embodiments, the IHWP 702 may have two portions, including a first portion through which the first orthogonal component signal Y passes and which may be oriented at about −22.5 degrees, and a second portion through which the second orthogonal component signal X passes and which may be oriented at about 22.5 degrees. The polarization state of the first orthogonal component signal Y after passing through IHWP 702 is denoted in FIG. 8 at 802Y, and the polarization state of the second orthogonal component signal X after passing through the IHWP 702 is denoted in FIG. 8 at 802X.

The first orthogonal component signal Y may continue to propagate at the upper level of the various optical components 700b of the DPSK demodulator 700a as shown in the overhead view of FIG. 7A. The second orthogonal component signal X may continue to propagate at the lower level of the various optical components 700b of the DPSK demodulator 700a as shown in the overhead view of FIG. 7B.

With combined reference FIGS. 7A and 7B, the first and second orthogonal component signals Y and X may then be provided to the CPBS 703. The CPBS 703 may include an interior surface 703a which may be oriented at about a 45° angle with respect to a propagation direction of the orthogonal component signals Y and X in some embodiments. In particular, an angle of incidence of each of the orthogonal component signals Y and X at the interior surface 703a may be about 45° with respect to the normal of the interior surface 703a. The interior surface 703a may be configured to split the orthogonal component signals Y and X by reflecting a first polarization component of each of the orthogonal component signals Y and X through a 90° angle, and by transmitting a second polarization component of each of the orthogonal component signals Y and X therethrough. For example, the orthogonal component signal Y may be separated into orthogonal components signals Y1 and Y2, where Y1 may be reflected 90° from the angle of incidence into the first optical path, and Y2 may be transmitted through the interior surface 703a into the second optical path. Thus, CPBS 703 separates the two orthogonal component signals Y and X into four orthogonal component signals Y1, Y2, X1 and X2.

Two orthogonal component signals including Y1 (FIG. 7A) and X1 (FIG. 7B) may travel in the first optical path. The orthogonal component signals Y1 and X1 travel through QWP1 704, are reflected by R1 706, and return through QWP1 704 to the interior surface 703a of the CPBS 703. Before reaching QWP1 704, the orthogonal component signals Y1 and X1 may have the polarization states denoted at 803Y1 and 803X1 respectively, shown in FIG. 8.

Referring again to FIGS. 7A and 7B, R1 706 may have a first substantially non-reflective surface 706a (hereinafter "first surface 706a") and a second substantially reflective surface 706b (hereinafter "second surface 706b"). The QWP1 704 may be located on or near the first surface 706a. In at least some example embodiments, QWP1 704 may be oriented at about 45 degrees. QWP1 704 may be configured to rotate the polarization state by 90° for each signal passing through it two times as described below.

After passing through the QWP1 704 once, Y1 (FIG. 7A) and X1 (FIG. 7B) may pass through the first surface 706*a* of R1 706 and may be reflected by the second surface 706*b* of R1 706. After being reflected by the second surface 706*b*, Y1 and X1 may pass through the QWP1 704 a second time. The net change in the polarization state of each of Y1 and X1 after passing through the QWP1 704 the first time, being reflected by the second surface 706*b*, and passing through the QWP1 704 the second time may be 90°. Thus, after passing through the QWP1 704 a second time, Y1 and X1 may have a polarization state denoted by 803Y1' and 803X1' respectively, shown in FIG. 8. Y1 and X1 may then re-enter CPBS 703 where each of Y1 and X1 may recombine at the interior surface 703*a* of the CPBS 703 with a corresponding one of the two orthogonal component signals traveling in the second optical path including Y2 (FIG. 7A) and X2 (FIG. 7B).

In the second optical path, Y2 (FIG. 7A) and X2 (FIG. 7B), may be transmitted through the interior surface 703*a* of CPBS 703, through the silicon plate 710, through the QWP2 705, and may be reflected by R2 707 before returning to the interior surface 703*a* through the QWP2 705 and the silicon plate 710. Before reaching QWP2 705, Y2 and X2 may have polarization states denoted at 804Y2 and 804X2 respectively, in FIG. 8.

Referring again to FIGS. 7A and 7B, R2 707 may have a first substantially non-reflective surface 707*a* (hereinafter "first surface 707*a*") and a second substantially reflective surface 707*b* (hereinafter "second surface 707*b*"). The QWP2 705 may be located on or near the first surface 707*a*. QWP2 705 may be oriented at about 45 degrees. QWP2 705 may be configured to shift the polarization state by 90° for each of Y2 (FIG. 7A) and X2 (FIG. 7B) after passing through QWP2 705 two times as described in more detail below.

After exiting the CPBS 703, each of Y2 and X2 may pass through the silicon plate 710, the QWP2 705, and the first surface 707*a* to enter R2 707, whereupon each of Y2 and X2 may then be reflected by the second surface 707*b* of R2 707. After reflection by the second surface 707*b*, Y2 and X2 may pass through QWP2 705 a second time where the polarization state of each of Y2 and X2 may be rotated by 90°. At the output of QWP2 705 after passing though it the second time, Y2 and X2 may have a polarization state denoted at 804Y2' and 804X2' respectively, shown in FIG. 8.

From the output of QWP2 705, Y2 and X2 may again pass through the silicon plate 710 before reaching the CPBS 703. Y2 and X2 may then re-enter CPBS 703 where each signal will recombine with the two orthogonal component signals from the first optical path including Y1 and X1 at the interior surface 703*a* of the CPBS 703 to create two orthogonal signal pairs Y1+Y2 and X1+X2.

In other words, the two orthogonal component signals including Y1 and X1 from the first optical path, and the two orthogonal component signals Y2 and X2 from the second optical path may be incident on the interior surface 703*a* of CPBS 703. At this point the two orthogonal component signals including Y1 and X1 originally reflected by the interior surface 703*a* may be transmitted, and the two orthogonal component signals including Y2 and X2 originally transmitted by the interior surface 703*a* may be reflected due to the polarization state rotations performed by a corresponding one of QWP1 704 or QWP2 705.

Thus, Y1 returning from the first optical path recombines at the upper level of CPBS 703 at the interior surface 703*a* with Y2 returning from the second optical path to form the orthogonal signal pair Y1+Y2. Additionally, X1 returning from the first optical path recombines at the lower level of CPBS 703 at the interior surface 703*a* with X2 returning from the second optical path to form the orthogonal signal pair X1+X2. The polarization states of the resulting orthogonal signal pair Y1+Y2 is denoted at 805Y and the polarization state of the resulting orthogonal signal pair X1+X2 is denoted at 805X shown in FIG. 8.

The first and second optical paths have an optical path difference to create a phase delay between the components in each orthogonal signal pair. In these and other embodiments, R1 706 and R2 707 may be composed of the same or different materials and have the same or different physical dimensions similar to R1 411 and R2 413 described above in reference to FIGS. 5A and 5B. In like manner, the material of R1 706 and R2 707 may be selected such that the first optical path has an optical path length L, and the second optical path has an optical path length L–ΔL. The predetermined difference ΔL may be configured to introduce a delay of one bit period between Y1 and X1 of the first optical path, and their respective orthogonal counterparts Y2 and X2 of the second optical path. For instance, R1 706 may be composed of SF-11 glass, while R2 707 may be composed of silicon glass.

Like the DQPSK demodulator 400, the DPSK demodulator 700*a* may also be of an athermal design such that any changes in the ambient temperature of the DPSK demodulator 700*a* do not affect the operation of the DPSK demodulator 700*a*. Thus, the CPBS 703, the QWP1 704, R1 706, the silicon plate 710, the QWP2 705, R2 707, the RAR 712, and the beam displacer 714 BD may all function in a similar manner to the analogous components in the DQPSK demodulator 400 described above in reference to FIGS. 5A and 5B. Additionally or alternatively, the silicon plate 710 may be configured to tune the DPSK demodulator 700*a* to a predetermined temperature dependent central wavelength as described in reference to FIGS. 5A and 5B above.

Returning to reference of FIGS. 7A and 7B, the two orthogonal signal pairs including Y1+Y2 and X1+X2 may be provided from CPBS 703 to the RAR 712. The RAR 712 may be composed of a material substantially transparent to light. The RAR 417 may also include a substantially reflective surface 712*a* (hereinafter "reflective surface 712*a*").

In the illustrated embodiment, the redirecting element is implemented as RAR 712 with the reflective surface 712*a* disposed on the hypotenuse of the RAR 712. The reflective surface 712*a* of the RAR 712 may be oriented at a 45° angle relative to the axis defined by the direction of travel of an incoming signal. The reflective surface 712*a* may include a reflective coating causing all signals within a predetermined frequency band to be substantially reflected.

The two orthogonal signal pairs including Y1+Y2 and X1+X2 may enter the RAR 712 and may then be reflected by the reflective surface 712*a* toward the BD 714. The BD 714 may be positioned to receive the orthogonal signal pairs Y1+Y2 and X1+X2 from the RAR 712. As shown in FIG. 7A, the Y-related orthogonal signal pair Y1+Y2 may be received by the BD 714 at the upper level, and the BD 714 may be configured to split the Y-related orthogonal signal pair into two distinct orthogonal components Y1+Y2 and Y1–Y2. As shown in FIG. 7B, the X-related orthogonal pair X1+X2 may be received by the BD 714 at the lower level, and the BD 714 may be configured to split the X-related orthogonal signal pair into two distinct orthogonal components X1+X2 and X1–X2. The polarization states of the four distinct orthogonal components Y1+Y2, Y1–Y2, X1+X2, and X1–X2 are denoted in FIG. 8 at 806*a* for Y1+Y2, 806*b* for Y1–Y2, 806*c* for X1+X2, and 806*d* for X1–X2.

With combined reference to FIGS. 7A and 7B, the OHWP 716 and OPBS 718 may be positioned to receive the output of BD 714. With combined reference to FIGS. 7D and 7E, the distinct orthogonal component signals Y1+Y2, Y1−Y2, X1+X2, and X1−X2 output by the BD 714 may be provided to OHWP 716 and to OPBS 718. The OHWP 716 and the OPBS 718 are illustrated in FIGS. 7D and 7E in the arbitrarily defined a-b coordinate system where the "a" axis is generally in a vertical direction, and the "b" axis is in a generally horizontal direction.

OPBS 718 may have a substantially non-reflective input surface 718a (hereinafter "input surface 718a") and a substantially non-reflective output surface 718b (hereinafter "output surface 718b"). OHWP 716 may be disposed on or near the input surface 718a of the OPBS 718. The OHWP 716 may be configured to rotate the polarization state of each of the distinct orthogonal components Y1−Y2 and X1+X2 by 90° in some embodiments, while not affecting the polarization states of the distinct orthogonal components Y1+Y2 and X1−X2. The polarization states of the four distinct orthogonal components after passing through OHWP 716 are denoted in FIG. 8 at 807a for Y1+Y2, 807b for Y1−Y2, 807c for X1+X2 and 807d for X1−X2. The OHWP 718 may have portions oriented at different angles such that each of the four distinct orthogonal component signals Y1+Y2, Y1−Y2, X1+X2, and X1−X2 may be rotated accordingly. The distinct orthogonal components may be variously rotated such that the polarization state 807a of Y1+Y2 is orthogonal to the polarization state 807c of X1+X2, and the polarization state 807b of Y1−Y2 is orthogonal to the polarization state 807d of X1−X2.

In at least some example embodiments, and as already mentioned, OHWP 716 may have four portions, including a first portion through which Y1+Y2 passes and oriented at about 0 degrees, a second portion through which X1+X2 passes and oriented at about 45 degrees, a third portion through which Y1−Y2 passes and oriented at about 45 degrees, and a fourth portion through which X1−X2 passes and oriented at about 0 degrees.

After each of the four distinct orthogonal components Y1+Y2, Y1−Y2, X1+X2, and X1−X2 have passed through OHWP 716 and are provided to OPBS 718, the OPBS 718 may then combine each of the two distinct orthogonal signals Y1+Y2 and Y1−Y2 from the upper level with a corresponding one of the two distinct signals X1+X2 and X1−X2 from the lower level to produce a total of two output signals 720a and 720b respectively illustrated in FIGS. 7D and 7E. In particular, OPBS 718 may combine Y1+Y2 with the orthogonal component below it, e.g., X1+X2, to produce the output signal Y1+Y2+X1+X2 denoted at 720b in FIG. 7E. Additionally, OPBS 718 may combine Y1−Y2 with the orthogonal component below it, e.g., X1−X2, to produce the output signal Y1−Y2+X1−X2 denoted at 720a in FIG. 7D. The polarization states of the two output signals Y1−Y2+X1−X2 720a and Y1+Y2+X1+X2 720b are denoted in FIG. 8 at 808a for Y1−Y2+X1−X2 720a and at 808b for Y1+Y2+X1+X2 720b. In each of the two output signals 720a and 720b, the distinct orthogonal components constructively and/or destructively interfere with each other to produce amplitude modulation in the corresponding output signals 720a and 720b that may be detected by a corresponding optical receiver.

Finally, the two output signals Y1+Y2+X1+X2 720b and Y1−Y2+X1−X2 720a may be provided to a collimated ribbon array such as the collimated ribbon array 307 shown in FIG. 3. The collimated ribbon array may be connected to a receiver array (not shown) configured to convert the two output signals 720a and 720b to electrical signals, which may then be communicated to a host (not shown).

Accordingly, as disclosed herein, the DPSK demodulator 700a is configured to receive a phase-modulated DPSK signal and convert it to two amplitude-modulated signals. In some embodiments, the phase-modulated DPSK signal has a 20 gigabit per second ("G") data rate, and each of the two amplitude-modulated signals has a 10G data rate. Alternately, the data rate of the phase-modulated DQPSK signal and of each of the final two amplitude-modulated signals may be different than 20G and 10G, respectively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A demodulator, comprising:
an input polarization beam splitter;
a cubical polarization beam splitter positioned to receive an output from the input polarization beam splitter;
an input half waveplate positioned between the input polarization beam splitter and the cubical polarization beam splitter;
a first reflector positioned to receive and return a first output from the cubical polarization beam splitter;
a first quarter waveplate positioned between the cubical polarization beam splitter and the first reflector;
a second reflector positioned to receive and return a second output from the cubical polarization beam splitter;
a second quarter waveplate positioned between the cubical polarization beam splitter and the second reflector;
a beam displacer positioned to receive a third output from the cubical polarization beam splitter;
an output polarization beam splitter positioned to receive an output from the beam displacer;
an output half waveplate positioned between the beam displacer and the output polarization beam splitter;
a wavelength tuner positioned between the second quarter waveplate and the cubical polarization beam splitter; and
a redirecting element optically positioned between the cubical polarization beam splitter and the beam displacer and configured to redirect the third output from the cubical polarization beam splitter toward the beam displacer.

2. The demodulator of claim 1, wherein:
the output from the input polarization beam splitter prior to passing through the input half waveplate comprises two orthogonally polarized components Y and X of an input to the input polarization beam splitter;
the first output from the cubical polarization beam splitter comprises a first portion Y1 of the component Y and a first portion X1 of the component X;
the second output from the cubical polarization beam splitter comprises a second portion Y2 of the component Y and a second portion X2 of the component X; and
the third output from the cubical polarization beam splitter comprises:
a first signal pair including the first and second portions Y1 and Y2 having a phase delay therebetween; and
a second signal pair including the first and second portions X1 and X2 having the phase delay therebetween.

3. The demodulator of claim 1, wherein the demodulator comprises a differential phase shift keying (DPSK) demodulator configured to receive a DPSK optical signal and convert it to two amplitude-modulated signals.

4. The demodulator of claim 3, wherein the DPSK optical signal has a data rate of about 20 gigabits per second and each of the two amplitude-modulated signals has a data rate of about 10 gigabits per second.

5. The demodulator of claim 1, further comprising:
an intermediate polarization beam splitter positioned between the input half waveplate and the cubical polarization beam splitter;
an intermediate half waveplate positioned between the intermediate polarization beam splitter and the cubical polarization beam splitter; and
a third quarter waveplate positioned between the beam displacer and the cubical polarization beam splitter.

6. The demodulator of claim 5, wherein:
the output from the input polarization beam splitter prior to passing through the input half waveplate comprises two orthogonally polarized components Y and X of an input to the input polarization beam splitter;
the output from the input polarization beam splitter after passing through the intermediate polarization beam splitter and prior to passing through the intermediate half waveplate comprises two orthogonally polarized subcomponents Ya and Yb of the Y component, and two orthogonally polarized subcomponents Xa and Xb of the X component;
the first output from the cubical polarization beam splitter comprises a first portion Ya1 of the subcomponent Ya, a first portion Yb1 of the subcomponent Yb, a first portion Xa1 of the subcomponent Xa, and a first portion Xb1 of the subcomponent Xb;
the second output from the cubical polarization beam splitter comprises a second portion Ya2 of the subcomponent Ya, a second portion Yb2 of the subcomponent Yb, a second portion Xa2 of the subcomponent Xa, and a second portion Xb2 of the subcomponent Xb; and
the third output from the cubical polarization beam splitter comprises:
a first signal pair including the first and second portions Ya1 and Ya2 having a phase delay therebetween;
a second signal pair including the first and second portions Yb1 and Yb2 having the phase delay therebetween;
a third signal pair including the first and second portions Xa1 and Xb1 having the phase delay therebetween; and
a fourth signal pair including the first and second portions Xb1 and Xb2 having the phase delay therebetween.

7. The demodulator of claim 5, wherein the demodulator comprises a differential quadrature phase shift keying (DQPSK) demodulator configured to receive a DQPSK optical signal and convert it to four amplitude-modulated signals.

8. The demodulator of claim 7, wherein the DQPSK optical signal has a data rate of about 40 gigabits per second and each of the four amplitude-modulated signals has a data rate of about 10 gigabits per second.

9. The DQPSK demodulator of claim 5, wherein:
the input half waveplate includes a first portion oriented at about 22.5 degrees, and a second portion oriented at about −22.5 degrees;
the output half waveplate includes a first portion oriented at about 22.5 degrees, a second portion oriented at about −22.5, a third portion oriented at about 22.5 degrees, a fourth portion oriented at about −22.5 degrees, a fifth portion oriented at about 22.5 degrees, a sixth portion oriented at about −22.5, a seventh portion oriented at about 22.5 degrees, and an eighth portion oriented at about −22.5 degrees; and
the intermediate half waveplate includes a first portion oriented at about 22.5 degrees, a second portion oriented at about −22.5, a third portion oriented at about 22.5 degrees, and a fourth portion oriented at about −22.5 degrees.

10. The demodulator of claim 1, wherein the wavelength tuner comprises a temperature-controlled silicon plate.

11. The demodulator of claim 1, wherein the redirecting element comprises a right angle reflector.

12. The demodulator of claim 1, wherein the demodulator is included in an optical receiver including:
a collimator positioned to provide an input to the input polarization beam splitter;
a collimated ribbon array positioned to receive an output comprising a plurality of optical signals from the second polarization beam splitter; and
a plurality of optical receivers positioned to receive the plurality of optical signals from the collimated ribbon array, and configured to convert each to an electrical signal.

13. The demodulator of claim 1, wherein the first reflector is thermally matched to the second reflector, such that a first optical path defined by the cubical polarization beam splitter and the first reflector is thermally matched to a second optical path defined by the cubical polarization beam splitter and the second reflector.

14. An optical receiver, comprising:
a collimator;
a demodulator comprising:
an input polarization beam splitter positioned to receive an input modulated signal from the collimator;
a cubical polarization beam splitter positioned to receive an output from the input polarization beam splitter;
an input half waveplate positioned between the input polarization beam splitter and the cubical polarization beam splitter;
a first reflector positioned to receive and return a first output from the cubical polarization beam splitter;
a first quarter waveplate positioned between the cubical polarization beam splitter and the first reflector;
a second reflector positioned to receive and return a second output from the cubical polarization beam splitter;
a second quarter waveplate positioned between the cubical polarization beam splitter and the second reflector;
a beam displacer positioned to receive a third output from the cubical polarization beam splitter;
an output polarization beam splitter positioned to receive an output from the beam displacer;
an output half waveplate positioned between the beam displacer and the output polarization beam splitter;
a wavelength tuner positioned between the second quarter waveplate and the cubical polarization beam splitter, the wavelength tuner comprising a temperature-controlled silicon plate; and
a redirecting element optically positioned between the cubical polarization beam splitter and the beam displacer and configured to redirect the third output from the cubical polarization beam splitter toward the beam displacer; and
a collimated ribbon array positioned to receive a plurality of output signals from the demodulator.

15. The optical receiver of claim 14, further comprising a housing defining a cavity within which the collimator, the demodulator, and the collimated ribbon array are each at least partially positioned.

16. The optical receiver of claim 14, wherein:
the input modulated signal from the collimator comprises a phase-modulated differential quadrature phase shift keying (DQPSK) signal and the plurality of output signals from the demodulator comprise four amplitude-modulated signals; or
the input modulated signal from the collimator comprises a phase-modulated differential phase shift keying (DPSK) signal and the plurality of output signals from the demodulator comprise two amplitude-modulated signals.

17. The optical receiver of claim 14, wherein the redirecting element comprises a right angle reflector.

18. A demodulator, comprising:
an input polarization beam splitter;
a cubical polarization beam splitter positioned to receive an output from the input polarization beam splitter;
an input half waveplate positioned between the input polarization beam splitter and the cubical polarization beam splitter;
a first reflector positioned to receive and return a first output from the cubical polarization beam splitter;
a first quarter waveplate positioned between the cubical polarization beam splitter and the first reflector;
a second reflector thermally matched to the first reflector and positioned to receive and return a second output from the cubical polarization beam splitter;
a second quarter waveplate positioned between the cubical polarization beam splitter and the second reflector;
a wavelength tuner positioned between the second quarter waveplate and the cubical polarization beam splitter;
a beam displacer positioned to receive a third output from the cubical polarization beam splitter;
a right angle reflector optically positioned between the cubical polarization beam splitter and the beam displacer and configured to redirect the third output from the cubical polarization beam splitter toward the beam displacer;
an output polarization beam splitter positioned to receive an output from the beam displacer; and
an output half waveplate positioned between the beam displacer and the output polarization beam splitter.

19. The demodulator of claim 18, further comprising:
an intermediate polarization beam splitter positioned between the input half waveplate and the cubical polarization beam splitter;
an intermediate half waveplate positioned between the intermediate polarization beam splitter and the cubical polarization beam splitter; and
a third quarter waveplate positioned between the beam displacer and the right angle reflector.

\* \* \* \* \*

UNITED STATES PATENT AND TRADEMARK OFFICE
CERTIFICATE OF CORRECTION

PATENT NO. : 8,792,155 B2  
APPLICATION NO. : 13/622656  
DATED : July 29, 2014  
INVENTOR(S) : Li et al.

Page 1 of 1

It is certified that error appears in the above-identified patent and that said Letters Patent is hereby corrected as shown below:

On the Title Page

Item (72), under "Inventors", in Column 1, Line 2, delete "Shangai" and insert -- Shanghai --, therefor.

Item (74), under "Attorney, Agent, or Firm", in Column 2, Line 1, delete "Machoff Brennan" and insert -- Maschoff Brennan --, therefor.

In the Specification

In Column 5, Line 51, delete "R2 412" and insert -- R2 413 --, therefor.

In Column 10, Line 38, delete "n/2 phase" and insert -- π/2 phase --, therefor.

Signed and Sealed this  
Third Day of March, 2015

Michelle K. Lee  
*Deputy Director of the United States Patent and Trademark Office*